US011597667B2

(12) United States Patent
Takahashi et al.

(10) Patent No.: US 11,597,667 B2
(45) Date of Patent: Mar. 7, 2023

(54) WASTEWATER TREATMENT SYSTEM, AIR SUPPLY AMOUNT CONTROL DEVICE, AND AIR SUPPLY AMOUNT CONTROL METHOD

(71) Applicant: METAWATER CO., LTD., Tokyo (JP)

(72) Inventors: Hiroyuki Takahashi, Tokyo (JP); Daisuke Naka, Tokyo (JP); Nobuki Tsuboi, Tokyo (JP); Masashi Inoue, Tokyo (JP)

(73) Assignee: Metawater Co., Ltd., Tokyo (JP)

( * ) Notice: Subject to any disclaimer, the term of this patent is extended or adjusted under 35 U.S.C. 154(b) by 145 days.

(21) Appl. No.: 16/583,755

(22) Filed: Sep. 26, 2019

(65) Prior Publication Data
US 2020/0017386 A1 Jan. 16, 2020

Related U.S. Application Data

(63) Continuation of application No. PCT/JP2017/028302, filed on Aug. 3, 2017.

(30) Foreign Application Priority Data

Mar. 30, 2017 (JP) .............................. JP2017-069281

(51) Int. Cl.
C02F 3/00 (2006.01)
C02F 3/20 (2006.01)
(Continued)

(52) U.S. Cl.
CPC .............. C02F 3/006 (2013.01); C02F 1/008 (2013.01); C02F 3/20 (2013.01); C02F 3/26 (2013.01);
(Continued)

(58) Field of Classification Search
CPC .... C02F 3/006; C02F 3/26; C02F 3/20; C02F 2209/001; C02F 2209/38; C02F 2209/03;
(Continued)

(56) References Cited

U.S. PATENT DOCUMENTS 7,153,429 B1 * 12/2006 Pedros .................... C02F 3/302
210/220
2003/0175942 A1 * 9/2003 Kim ...................... C02F 3/1263
588/316
(Continued)

FOREIGN PATENT DOCUMENTS

CN 1837088 A * 9/2006
JP S50-122060 A1 9/1975
(Continued)

OTHER PUBLICATIONS

Guidelines and Commentary for Planning and Design of Sewage Facilities, Sep. 15, 2009, pp. 102-105 (with English translation).
(Continued)

Primary Examiner — Joseph W Drodge
(74) Attorney, Agent, or Firm — Burr Patent Law, PLLC

(57) ABSTRACT

A wastewater treatment system includes a plurality of reaction tanks, a blowing pipe, a blower unit, and an air supply amount controller. The air supply amount controller includes: a water quality measurement unit configured to measure a state of wastewater; a necessary air amount acquisition unit configured to acquire, a necessary air amount for achieving a predetermined target water quality of wastewater; a target in-pipe pressure calculation unit configured to calculate a blowing pipe loss pressure when the necessary amount of air is supplied into the blowing pipe, calculate a target in-pipe pressure based on the blowing pipe loss pressure, and change the calculated target in-pipe pressure in accordance with change of the necessary air amount; and a blowing control unit configured to control air supply from the blower unit so that the pressure in the blowing pipe becomes equal to the target in-pipe pressure.

8 Claims, 8 Drawing Sheets

(51) Int. Cl.
*C02F 3/26* (2006.01)
*C02F 1/00* (2006.01)

(52) U.S. Cl.
CPC .... *C02F 2209/001* (2013.01); *C02F 2209/38* (2013.01)

(58) Field of Classification Search
CPC .............. C02F 2209/04; C02F 2209/22; C02F 2209/005; C02F 2209/14; C02F 2209/15; C02F 1/008; Y02W 10/10; G01N 33/188; G01N 33/18; G01N 33/1826; B01F 35/211; B01F 35/2113; B01F 35/213; B01F 35/221; B01F 35/2213
USPC .................. 210/614, 96.1, 143, 739, 741
See application file for complete search history.

(56) References Cited

U.S. PATENT DOCUMENTS

| | | | | |
|---|---|---|---|---|
| 2006/0254979 | A1* | 11/2006 | Koopmans | C02F 3/20 210/220 |
| 2008/0135493 | A1* | 6/2008 | Clidence | B01F 25/32 210/741 |
| 2009/0301963 | A1* | 12/2009 | Brockmann | C02F 3/1273 210/601 |
| 2010/0243565 | A1* | 9/2010 | Isaka | C02F 3/302 210/150 |
| 2010/0300968 | A1* | 12/2010 | Liu | C02F 3/1273 210/138 |
| 2014/0374345 | A1* | 12/2014 | Furuya | C02F 3/006 137/88 |
| 2014/0374346 | A1* | 12/2014 | Furuya | C02F 3/305 137/88 |
| 2017/0008775 | A1* | 1/2017 | Finke | C02F 1/008 |
| 2017/0313608 | A1* | 11/2017 | Peterson | B01D 61/04 |
| 2018/0093911 | A1* | 4/2018 | Dove | C02F 3/34 |
| 2018/0280915 | A1* | 10/2018 | Dove | C10M 173/02 |
| 2018/0280916 | A1* | 10/2018 | Dove | C02F 1/487 |

FOREIGN PATENT DOCUMENTS

| | | |
|---|---|---|
| JP | S56-129088 A1 | 10/1981 |
| JP | S58-027692 A1 | 2/1983 |
| JP | S60-125297 A1 | 7/1985 |
| JP | S61-129092 A1 | 6/1986 |
| JP | S61-157397 A1 | 7/1986 |
| JP | S61-143697 U | 9/1986 |
| JP | H09-047780 A1 | 2/1997 |
| JP | 2012-135717 A1 | 7/2012 |
| JP | 2015-182036 A1 | 10/2015 |

OTHER PUBLICATIONS

Japanese Notice (Application No. 2017-069281) dated Jan. 7, 2020 (with English translation).
International Search Report and Written Opinion (Application No. PCT/JP2017/028302) dated Oct. 31, 2017.

* cited by examiner

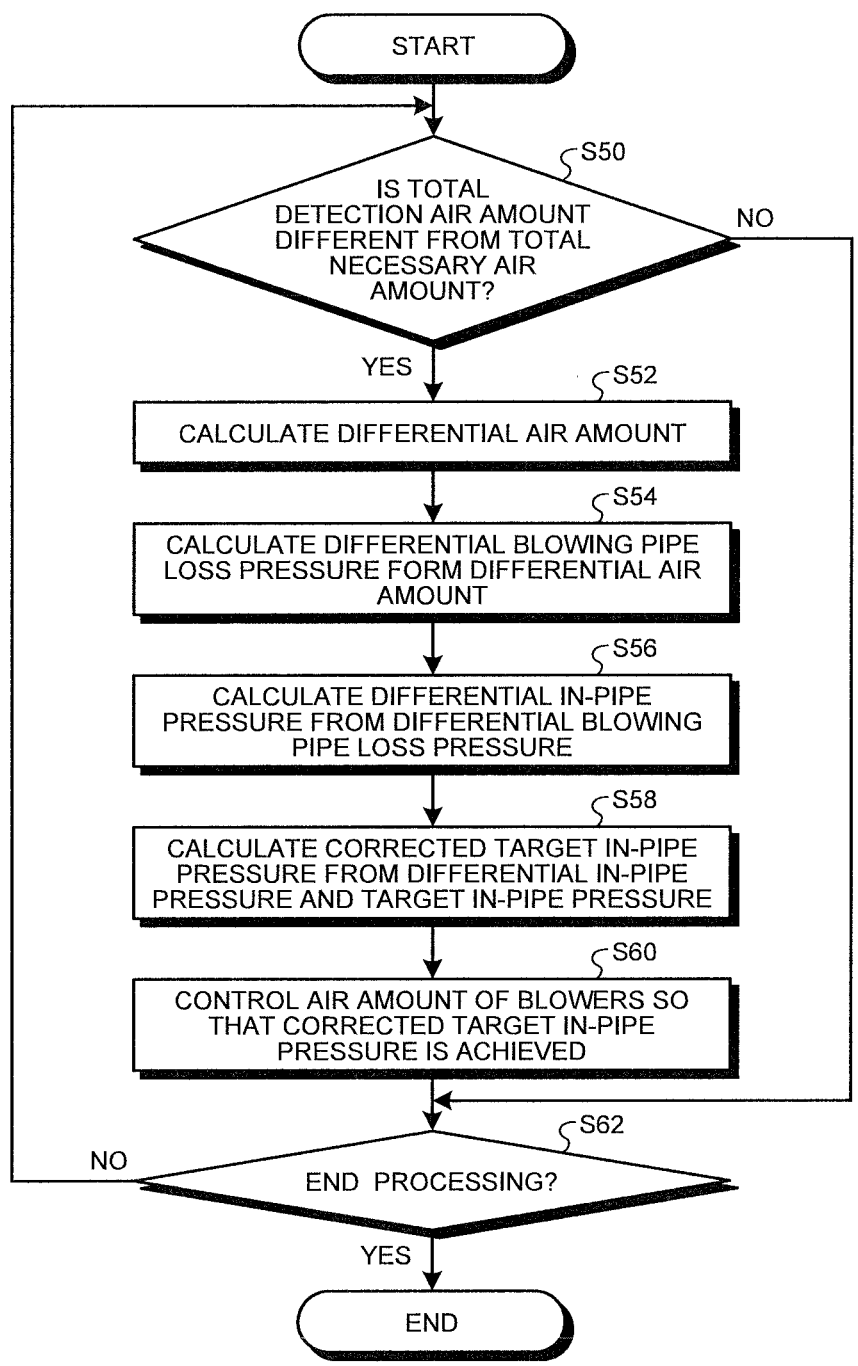

WASTEWATER TREATMENT SYSTEM, AIR SUPPLY AMOUNT CONTROL DEVICE, AND AIR SUPPLY AMOUNT CONTROL METHOD

CROSS-REFERENCE TO RELATED APPLICATIONS

This application is a continuation application of PCT international Application No. PCT/JP2017/028302, which designates the United States, incorporated herein by reference, and which claims the benefit of priority from Japanese Patent Application No. 2017-069281, filed on Mar. 30, 2017, the entire contents of all of which are incorporated herein by reference.

BACKGROUND OF THE INVENTION

1. Field of the Invention

The present invention relates to a wastewater treatment system, an air supply amount control device for a wastewater treatment device, and a method of controlling an air supply amount of the wastewater treatment device.

2. Description of Related Art

A wastewater treatment system configured to treat wastewater such as domestic drainage or industrial drainage practically uses various treatment methods including a standard activated sludge method. In the wastewater treatment system, aeration treatment is performed in which wastewater to be treated flows into a reaction tank while air is supplied to aerobic microorganisms in the reaction tank. Accordingly, organic substances included in the wastewater in the reaction tank are decomposed through biotreatment of aerobic microorganisms, and a stable treated water quality is obtained.

Air for the aeration treatment in the reaction tank is supplied from a blower through a blowing pipe. As illustrated in, for example, Patent Literature 1, the blower controls the amount of supplied air to achieve an air amount necessary for the biotreatment in the reaction tank. The blower supplies air so that the pressure in the blowing pipe is constant in some cases. When the pressure in the blowing pipe is constant, the pressure in the blowing pipe is set to be a value sufficient to supply air in an amount necessary for reliably performing the biotreatment in the reaction tank. Thus, the pressure in the blowing pipe is set to be a value with which the biotreatment is sufficiently performed at an assumed maximum load (for example, the concentration or BOD of ammoniac nitrogen as a biotreatment target) of wastewater having flowed into the reaction tank. Patent Literature 2 discloses a technology of determining the pressure in the blowing pipe so that the opening degree of an air introduction valve, which is connected to an aeration tank for which the necessary air amount is maximum among a plurality of aeration tanks, is maximum.

CITATION LIST

Patent Literature

Patent Literature 1: Japanese Laid-open Patent Publication No. 9-47780
Patent Literature 2: Japanese Laid-open Patent Publication No. 56-129088

SUMMARY OF THE INVENTION

However, when the pressure in the blowing pipe is set based on the assumed maximum load, an unnecessary amount of air is supplied in a case in which a load in the reaction tank is lower than the maximum load. In this case, the amount of air supplied to the reaction tank is restricted by a valve provided in the blowing pipe, but the blower supplies air at a pressure for achieving the assumed maximum load, and thus part of energy reserved for sending the air is wasted. In other words, when the pressure in the blowing pipe is controlled to be constant, energy consumption of sending air is higher than the energy actually needed to send the air. When air is blown to a plurality of aeration tanks, the degree of a pressure loss is different between pipes connected with the respective aeration tanks. Thus, as disclosed in Patent Literature 2, when an in-pipe pressure is set based on the necessary air amount of one aeration tank, an appropriate amount of air potentially cannot be supplied to any other aeration tank at the in-pipe pressure. For example, with the in-pipe pressure set based on the necessary air volume of one aeration tank, a necessary amount of air potentially cannot be supplied to another aeration tank having a larger degree of a pressure loss. In this manner, the wastewater treatment system is required to appropriately supply air to each tank while reducing energy consumption of blowing air.

The present invention is intended to solve the above-described problem by providing a wastewater treatment system, an air supply amount control device, and an air supply amount control method that appropriately supply air to each tank while reducing energy consumption of blowing air.

To solve the problem and achieve the object above, a wastewater treatment system in the present disclosure includes a plurality of reaction tanks configured to perform biotreatment on wastewater; a blowing pipe connected with the reaction tanks; a blower unit configured to supply air for performing the biotreatment to the reaction tanks through the blowing pipe; and an air supply amount controller configured to control the amount of air supplied to the reaction tanks, wherein the air supply amount controller includes a water quality measurement unit provided at the reaction tanks and configured to measure a state of wastewater in the reaction tank, a necessary air amount acquisition unit configured to acquire, for each of the reaction tanks based on a measurement result by the water quality measurement unit, a necessary air amount for achieving a predetermined target water quality of wastewater in the reaction tank, a target in-pipe pressure calculation unit configured to calculate a blowing pipe loss pressure as a pressure of air lost due to a pressure loss in the blowing pipe when the necessary air amount is supplied into the blowing pipe, calculate a target in-pipe pressure in the blowing pipe based on the blowing pipe loss pressure, and change the target in-pipe pressure calculated in accordance with change of the necessary air amount; and a blowing control unit configured to control air supply from the blower unit so that the pressure in the blowing pipe becomes equal to the target in-pipe pressure.

It is preferable that the target in-pipe pressure calculation unit sums the blowing pipe loss pressure, a loss pressure due to a pressure loss of a diffuser provided in the reaction tank and configured to diffuse, in the reaction tank, air from the blowing pipe, and a water head pressure of wastewater in the reaction tank, and calculates the target in-pipe pressure so that the target in-pipe pressure is equal to or larger than the sum.

It is preferable that the blowing pipe includes a header pipe connected with the blower unit, a plurality of branch pipes branched from the header pipe and connected with the reaction tanks, respectively, an introduction valve provided to the branch pipe, and a branch pipe air amount measurement unit configured to measure, as a detection air amount, the amount of air supplied to each branch pipe, and the air supply amount controller includes an introduction air control unit configured to adjust an opening degree of the introduction valve so that the detection air amount becomes equal to the necessary air amount at each branch pipe.

It is preferable that the air supply amount controller further includes a differential air amount calculation unit configured to calculate, when a total detection air amount as the sum of the detection air amounts of the branch pipes is different from a total necessary air amount as the sum of the necessary air amounts of the reaction tanks, a differential air amount as the difference between the necessary air amount and the detection air amount for each of the reaction tanks, the target in-pipe pressure calculation unit corrects the target in-pipe pressure based on a loss pressure due to a pressure loss in the blowing pipe when the differential amount of air is supplied into the blowing pipe, and the blowing control unit controls air supply from the blower unit so that the pressure in the blowing pipe becomes equal to the corrected target in-pipe pressure.

It is preferable that the necessary air amount acquisition unit includes a relation storage unit configured to store a water-quality air-amount relation as a relation between the amount of air supplied to the reaction tank and a change amount of water quality in the reaction tank when the amount of air is supplied, and a necessary air amount calculation unit configured to calculate, as the necessary air amount, the amount of air necessary for changing the water quality of the wastewater to the target water quality based on the water-quality air-amount relation, a result of water quality measurement by the water quality measurement unit, and the target water quality.

It is preferable that the relation storage unit stores the water-quality air-amount relation as a primary delay system in which change of the water quality of the wastewater is delayed from change of the amount of air supplied into the reaction tank, and the necessary air amount calculation unit updates the necessary air amount based on a result of the water quality measurement by the water quality measurement unit for each elapse of a predetermined time.

To solve the problem and achieve the object above, an air supply amount control device in the present disclosure is configured to control an air supply amount of a wastewater treatment device including: a plurality of reaction tanks configured to perform biotreatment on wastewater; a blowing pipe connected with the reaction tanks; and a blower unit configured to supply air for performing the biotreatment to the reaction tanks through the blowing pipe, the air supply amount control device comprising: a water quality measurement unit provided at the reaction tanks and configured to measure a state of wastewater in the reaction tank; a necessary air amount acquisition unit configured to acquire, for each of the reaction tanks based on a measurement result by the water quality measurement unit, a necessary air amount for achieving a predetermined target water quality of wastewater in the reaction tank; a target in-pipe pressure calculation unit configured to calculate a blowing pipe loss pressure as a pressure of air lost due to a pressure loss in the blowing pipe when the necessary air amount is supplied into the blowing pipe, calculate a target in-pipe pressure in the blowing pipe based on the blowing pipe loss pressure, and change the target in-pipe pressure calculated in accordance with change of the necessary air amount; and a blowing control unit configured to control air supply from the blower unit so that the pressure in the blowing pipe becomes equal to the target in-pipe pressure.

To solve the problem and achieve the object above, an air supply amount control method in the present disclosure is a method of controlling an air supply amount of a wastewater treatment device including: a plurality of reaction tanks configured to perform biotreatment on wastewater; a blowing pipe connected with the reaction tanks; and a blower unit configured to supply air for performing the biotreatment to the reaction tanks through the blowing pipe, the method comprising: a measurement step of measuring a state of wastewater in the reaction tanks; a necessary air amount acquisition step of acquiring, for each of the reaction tanks based on a measurement result of a state of the wastewater, a necessary air amount for achieving a predetermined target water quality of wastewater in the reaction tank; a target in-pipe pressure calculation step of calculating a blowing pipe loss pressure as a pressure of air lost due to a pressure loss in the blowing pipe when the necessary air amount is supplied into the blowing pipe, calculating a target in-pipe pressure in the blowing pipe based on the blowing pipe loss pressure, and changing the target in-pipe pressure calculated in accordance with change of the necessary air amount; and an air-sending control step of controlling air supply from the blower unit so that the pressure in the blowing pipe becomes equal to the target in-pipe pressure.

Advantageous Effects of Invention

According to the present invention, air can be appropriately supplied to each tank while energy consumption of blowing air is reduced.

BRIEF DESCRIPTION OF DRAWINGS

FIG. 9 is a flowchart for describing a process of correcting an in-pipe pressure according to the second embodiment.

DETAILED DESCRIPTION OF THE INVENTION

Preferable embodiments of a wastewater treatment system according to the present invention will be described below in detail with reference to the accompanying drawings. The present invention is not limited by the embodiments.

First Embodiment (Configuration of Wastewater Treatment System)

Figure 1:
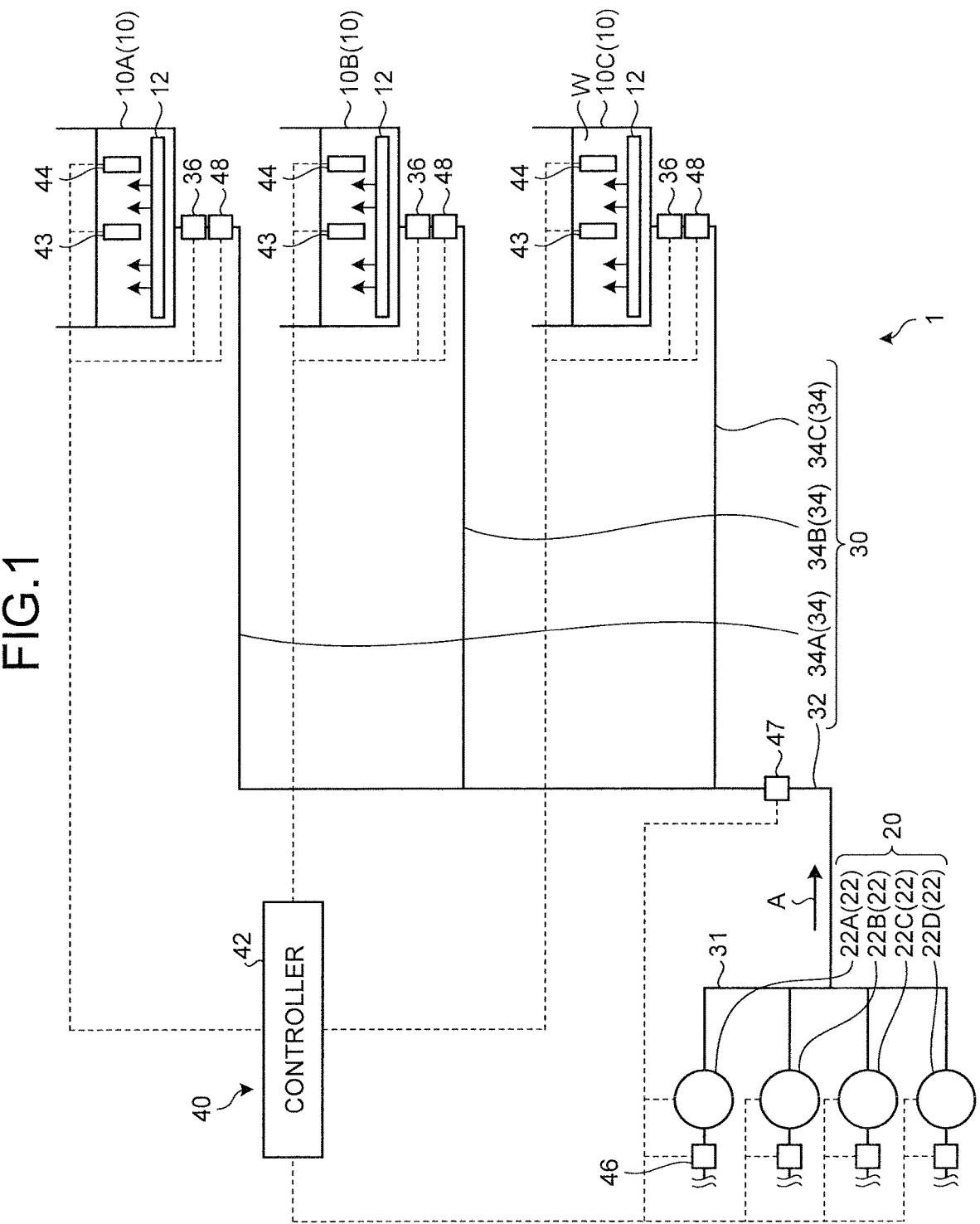
FIG. 1 is a schematic diagram of a wastewater treatment system according to a first embodiment.

FIG. 1 is a schematic diagram of a wastewater treatment system according to a first embodiment. As illustrated in FIG. 1, a wastewater treatment system 1 according to the first embodiment includes reaction tanks 10A, 10B, and 10C, a blower unit 20, a blowing pipe 30, and an air supply amount controller 40. In the wastewater treatment system 1, air from the blower unit 20 is supplied into each of the reaction tanks 10 through the blowing pipe 30 while an amount of air supplied into the reaction tank 10 is controlled by the air supply amount controller 40, and biotreatment of wastewater W in the reaction tank 10 is performed through activated sludge therein.

The reaction tanks 10A, 10B, and 10C are each a tank in which a diffuser 12 is provided and activated sludge is accumulated. The wastewater W flows from a sedimentation tank (not illustrated) into the reaction tanks 10A, 10B, and 10C. The wastewater W is water after solid matters are partially separated from raw water through the sedimentation tank (not illustrated). The raw water is domestic drainage and sewage discharged from homes and factories, for example. The diffuser 12 aerates the accumulated activated sludge with air supplied from the blower unit 20. The reaction tanks 10A, 10B, and 10C each perform biotreatment on the wastewater W by the aerated activated sludge, and discharge treated water as the wastewater W subjected to the biotreatment to a solid-liquid separation tank (not illustrated). The solid-liquid separation tank (not illustrated) further performs solid-liquid separation treatment on the treated water, and discharges the water subjected to the solid-liquid separation treatment to external environment after, for example, disinfectant treatment.

The reaction tanks 10A, 10B, and 10C are provided in parallel to each other. Specifically, the wastewater W is supplied from the sedimentation tank to the reaction tanks 10A, 10B, and 10C in parallel. However, the reaction tanks 10A, 10B, and 10C may be disposed in series with each other. Specifically, the reaction tank 10A may be connected with the reaction tank 10B, and the wastewater W subjected to biotreatment in the reaction tank 10A may be introduced to the reaction tank 10B and subjected to biotreatment again in the reaction tank 10B. The reaction tanks 10A, 10B, and 10C are three aerobic tanks, but the number thereof is optional. The reaction tanks 10A, 10B, and 10C may include anaerobic and anoxic tanks connected in series with each other. Hereinafter, the reaction tanks 10A, 10B, and 10C are referred to as the reaction tanks 10 when not distinguished from each other.

As illustrated in FIG. 1, the blower unit 20 includes a plurality of blowers 22A, 22B, 22C, and 22D. The blowers 22A, 22B, 22C, and 22D have identical functions. The blowers 22A, 22B, 22C, and 22D each introduce air from the outside through an inlet vane and discharge the introduced air by rotating a blade part. In the blowers 22A, 22B, 22C, and 22D, an opening degree of the inlet vane is adjustable, and a rotation speed of the blade part is adjustable. The blowers 22A, 22B, 22C, and 22D are connected in parallel with the blowing pipe 30 on a side where air is discharged through the blade part, and discharge air to the blowing pipe 30. Hereinafter, the blowers 22A, 22B, 22C, and 22D are referred to as the blowers 22 when not distinguished from each other. The number of blowers 22 included in the blower unit 20 is optional.

The blowing pipe 30 is a pipe in which air is conducted. The blowing pipe 30 includes an introduction pipe 31, a header pipe 32, branch pipes 34A, 34B, and 34C, and an introduction valve 36. The introduction pipe 31 has one end part branched and connected with the respective blowers 22, and is supplied with air from the blowers 22. The introduction pipe 31 has the other end part connected with the header pipe 32, merges air from each blower 22, and conducts merged air A to the header pipe 32. The header pipe 32 is one pipe. The header pipe 32 is connected with the branch pipes 34C, 34B, and 34A in this order from an upstream side in the flow of the air A, in other words, from the blower 22 side.

The branch pipe 34A is connected with the diffuser 12 of the reaction tank 10A on a side opposite to its connection part with the header pipe 32, and supplies part of the air A from the header pipe 32 to the reaction tank 10A. The branch pipe 34B is connected with the diffuser 12 of the reaction tank 10B on a side opposite to its connection part with the header pipe 32, and supplies part of the air A from the header pipe 32 to the reaction tank 10B. The branch pipe 34C is connected with the diffuser 12 of the reaction tank 10C on a side opposite to its connection part with the header pipe 32, and supplies part of the air A from the header pipe 32 to the reaction tank 10C. The introduction valve 36 is attached to each of the branch pipes 34A, 34B, and 34C. The introduction valve 36 is a valve opened and closed by the air supply amount controller 40, and the opening degree thereof is adjusted to adjust the amount of air supplied to each of the reaction tanks 10. Hereinafter, the branch pipes 34A, 34B, and 34C are referred to as branch pipes 34 when not distinguished from each other.

The air supply amount controller 40 as an air supply amount control device includes a controller 42, a nitrate meter 43 and an ammonia meter 44 as water quality measurement units, an intake air measurement unit 46, a header in-pipe pressure measurement unit 47, and a branch pipe air amount measurement unit 48. The controller 42 is a control device configured to control the amount of air supplied into each of the reaction tanks 10 based on measurement results by the nitrate meter 43, the ammonia meter 44, the intake air measurement unit 46, the header in-pipe pressure measurement unit 47, and the branch pipe air amount measurement unit 48. The controller 42 will be described later in detail. The air supply amount controller 40 controls the amount of air supplied to the reaction tanks 10, but may be provided to each of the reaction tanks 10 and control the amount of air supplied to the reaction tank 10.

The nitrate meter 43 is a sensor provided in each of the reaction tanks 10 and configured to measure the nitrate concentration of the wastewater W in the reaction tank 10. In the present embodiment, the nitrate of the wastewater W is a concept including nitrate ($HNO_3$), nitrite ($HNO_2$), nitrate-nitrogen ($NO_3$—N), nitrite-nitrogen ($NO_2$—N), the group of nitrate-nitrogen and nitrite-nitrogen, and $NO_x$ indicating nitrate and nitrite. In other words, the nitrate concentration in the present embodiment may be the concentration of any of nitrate, nitrite, nitrate-nitrogen, nitrite-nitrogen, the group of nitrate-nitrogen and nitrite-nitrogen, and $NO_x$ indicating nitrate and nitrogen monoxide.

The ammonia meter 44 is a sensor provided in each of the reaction tanks 10 and configured to measure the ammonia concentration of the wastewater W in the reaction tank 10. In the present embodiment, the ammonia concentration of the wastewater W is a concept including ammonia and ammonia nitrogen. Specifically, the ammonia concentration in the present embodiment may be the concentration of any of ammonia ($NH_3$) and ammonia nitrogen ($NH_4$—N). Accordingly, the nitrate meter 43 and the ammonia meter 44 measure a state of the wastewater W in the reaction tank 10. The water quality measurement units, in other words, the nitrate meter 43 and the ammonia meter 44 are provided to each of the reaction tanks 10, but one water quality measurement unit may be provided to the plurality of the reaction tanks 10.

The intake air measurement unit 46 is provided on an intake side of each blower 22 and measures an amount of air taken in by the blower 22. The header in-pipe pressure measurement unit 47 is attached to the header pipe 32 and measures a pressure in the header pipe 32, in other words, a pressure of air supplied from each blower 22. More specifically, the header in-pipe pressure measurement unit 47 is provided on an upstream side of a flow of the air A with regard to the branch pipe 34C, in other words, the header in-pipe pressure measurement unit 47 is provided on the upstream side of the flow of the air A with regard to a connection part of any branch pipe 34. The branch pipe air amount measurement unit 48 is provided to each branch pipe 34, and measures the amount of air supplied from the branch pipe 34 to the reaction tank 10. More specifically, the branch pipe air amount measurement unit 48 is provided on the upstream side of the airflow with regard to the introduction valve 36, in other words, between the introduction valve 36 and the header pipe 34 in the branch pipe 34. The branch pipe air amount measurement unit 48 measures, as a detection air amount, the amount of air supplied to the branch pipe 34, more specifically, the amount of air on the upstream side of the introduction valve 36 in the branch pipe 34. In other words, the branch pipe air amount measurement unit 48 measures, as the detection air amount, the amount of air supplied from the branch pipe 34 to the reaction tank 10 through the introduction valve 36.

(Water Treatment in Reaction Tank)

The following describes biotreatment of the wastewater W in the reaction tank 10. In the reaction tank 10, nitrification reaction occurs due to nitrification bacteria as aerobic microorganisms in activated sludge under an aerobic condition, in other words, ammoniac nitrogen ($NH_4$—N) in treated water is nitrified into nitrite-nitrogen ($NO_2$—N) and nitrate-nitrogen ($NO_3$—N) as expressed in reaction formulae (1) to (3) below.

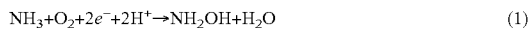

$$NH_3+O_2+2e^-+2H^+\rightarrow NH_2OH+H_2O \quad (1)$$

$$NH_2OH+H_2O\rightarrow NO_2^-+5H^++4e^- \quad (2)$$

$$NO_2^-+0.5O_2\rightarrow NO_3^- \quad (3)$$

In a region in which the amount of oxygen in treated water is small in the reaction tank 10, denitrification reaction (anaerobic reaction) due to denitrification bacteria occurs because of small amount of oxygen. The denitrification reaction can be sufficiently promoted by supplying a sufficient amount of carbon source to the region (denitrification reaction region) in which the denitrification reaction occurs. As a result, the denitrification reaction occurs at partial regions of the reaction tank 10. Accordingly, nitrogen can be removed through decomposing into nitrogen and carbon dioxide by decomposing nitrite ($N_2O$) gas generated due to insufficient nitrification or by reduction of nitrite without generating nitrite, as expressed in reaction formulae (4) to (10) below.

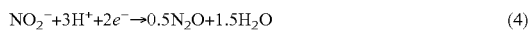

$$NO_2^-+3H^++2e^-\rightarrow 0.5N_2O+1.5H_2O \quad (4)$$

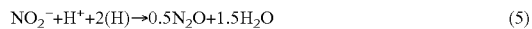

$$NO_2^-+H^++2(H)\rightarrow 0.5N_2O+1.5H_2O \quad (5)$$

$$NO_3^-+H^++5(H)\rightarrow 0.5N_2+3H_2O \quad (6)$$

$$NO_3^-+2H\rightarrow NO_2^-+H_2O \quad (7)$$

$$NO_2^-+H^++(H)\rightarrow NO+H_2O \quad (8)$$

$$NO+(H)\rightarrow 0.5N_2O+0.5H_2O \quad (9)$$

$$N_2O+2(H)\rightarrow N_2+H_2O \quad (10)$$

The nitrate meter 43 detects the degree of progression of the denitrification reaction, in other words, the degree of decomposition of nitrate by measuring the nitrate concentration of the wastewater W in the reaction tank 10. The ammonia meter 44 detects the degree of progression of the nitrification reaction, in other words, the degree of decomposition of ammonia by measuring the ammonia concentration of the wastewater W in the reaction tank 10. The air supply amount controller 40 controls the amount of air supplied to the reaction tank 10 based on the measurement results by the nitrate meter 43 and the ammonia meter 44. For example, the air supply amount controller 40 determines that the denitrification reaction is insufficient when the nitrate concentration is higher than a predetermined numerical value range, and decreases the amount of air supplied to the reaction tank 10. When the nitrate concentration is lower than the predetermined numerical value range, the air supply amount controller 40 determines that the nitrification reaction is insufficient and progression of the denitrification reaction is too much, and increases the amount of air supplied to the reaction tank 10. Similarly, the air supply amount controller 40 determines that the nitrification reaction is insufficient when the ammonia concentration is higher than a predetermined numerical value range, and increases the amount of air supplied to the reaction tank 10. When the ammonia concentration is lower than the predetermined numerical value range, the air supply amount controller 40 determines that the denitrification reaction is insufficient and progression of the nitrification reaction is too much, and decreases the amount of air supplied to the reaction tank 10. In other words, the nitrate meter 43 detects the progression degree of the denitrification reaction relative to the progression degree of the nitrification reaction.

The following supplementarily describes exemplary check of the progression degree of the denitrification reaction by the nitrate meter 43. In the present embodiment, each of the reaction tanks 10 is operated so that the concentration of activated sludge is constant, and the speed of nitrification reaction due to one nitrification bacterium and the speed of denitrification due to one denitrification bacterium are substantially constant at room temperature. The water quality of the wastewater W, in other words, the ammonia concentration thereof is maintained within a predetermined concentration due to a predetermined designed water quality, and is substantially constant. The inflow amount of the wastewater W into the reaction tank 10 varies. The inside of the reaction tank 10 in which the nitrification reaction and the denitrification reaction occur in parallel is divided into an aerobic region and an anaerobic region. The aerobic region is an oxygen-rich region in which the nitrification reaction mainly progresses. The anaerobic region is a region in which no oxygen exists or the oxygen concentration is low and the denitrification reaction mainly progresses. For example, the amount of nitrification (nitrified amount) and the amount of denitrification (denitrificated amount) at a position where the nitrate meter 43 is provided correspond to a ratio of the aerobic region and the anaerobic region. The nitrate concentration corresponds to a value obtained by subtracting the amount of denitrification from the amount of nitrification. The nitrate meter 43 detects, by detecting the nitrate concentration, the volume difference between the aerobic region and the anaerobic region from the upstream side to the position where the nitrate meter 43 is provided in the reaction tank 10. Then, the total volume from the upstream side to the position where the nitrate meter 43 is provided in the reaction tank 10 is known based on the size of the reaction tank 10. Thus, the nitrate meter 43 can detect the amount of denitrification, in other words, the progression degree of the denitrification reaction by detecting the nitrate concentration. In the present embodiment, the progression degree of the denitrification reaction is detected by the nitrate meter 43, but the present invention is not limited to the nitrate meter 43, and the detection may be performed by, for example, a pair of dissolved oxygen concentration meters, a pair of ORP meters, or a pair of ammonia meters that can check the progression degree of the denitrification reaction.

The nitrate meter 43 is disposed on the upstream side of the wastewater W in the reaction tank 10 with respect to the ammonia meter 44, in other words, a side (the sedimentation tank (not illustrated) side) from which the wastewater is supplied. The inside of the reaction tank 10 is divided into an upstream treatment region and a downstream treatment region from the upstream side toward the downstream side with respect to the wastewater W, in other words, from the side (the sedimentation tank (not illustrated) side) from which the wastewater W is supplied toward a side (solid separation tank side (not illustrated)) from which treated water after biotreatment is discharged. The progression degree of nitrification treatment and the progression degree of denitrification treatment are each different between the upstream region and the downstream region. The upstream region is a region on the upstream side of the wastewater W, in which the nitrification treatment and the denitrification treatment progress at predetermined ratios, for example at substantially same ratios. The downstream region is a region downstream with respect to the upstream region of the wastewater W, in which the nitrification treatment and the denitrification treatment is performed similarly to the upstream region. However, the progression speed of the nitrification treatment in the downstream region is higher than the progression speed of the nitrification treatment in the upstream region and is higher than the progression speed of the denitrification treatment in the downstream region. The nitrate meter 43 is provided between the upstream region and the downstream region (for example, at a central position between the upstream side and the downstream side of the wastewater W), and the ammonia meter 44 is disposed in the downstream region downstream with respect to the nitrate meter 43.

As described above, the air supply amount controller 40 controls the amount of air in the reaction tank 10 based on the results of the detection by the nitrate meter 43 and the ammonia meter 44, and executes simultaneous nitrification-denitrification control including both biotreatments of the nitrification treatment and the denitrification treatment in the reaction tank 10. However, the air supply amount controller 40 may not perform simultaneous nitrification-denitrification treatment in the reaction tank 10. For example, the air supply amount controller 40 may include any one of the nitrate meter 43 and the ammonia meter 44, and may control the amount of air in the reaction tank 10 based on a result of measurement by the meter. Alternatively, for example, the air supply amount controller 40 may include, as a water quality measurement unit, a dissolved oxygen meter configured to measure the amount of dissolved oxygen of the wastewater W in the reaction tank 10 in place of the nitrate meter 43 and the ammonia meter 44. In this case, the air supply amount controller 40 controls the amount of air supplied to the reaction tank 10 so that the amount of dissolved oxygen is constant based on the amount of dissolved oxygen in the wastewater W measured by the dissolved oxygen meter (dissolved oxygen amount control). In a case of the dissolved oxygen amount control, an anaerobic tank or an oxygen-free tank may be connected in series with the reaction tank 10, and the wastewater W subjected to the nitrification treatment in the reaction tank 10 may be subjected to the denitrification treatment.

Alternatively, the air supply amount controller 40 may include, as a water quality measurement unit, a flow meter configured to measure the inflow amount of the wastewater W in the reaction tank 10 in place of the nitrate meter 43 and the ammonia meter 44. In this case, the air supply amount controller 40 controls, based on the inflow amount of the wastewater W into the reaction tank 10 measured by the flow meter, the amount of air supplied to the reaction tank 10 to achieve a target concentration of the wastewater W in this amount (inflow water amount control). In a case of the inflow amount control, an anaerobic tank or an oxygen-free tank may be connected in series with the reaction tank 10, and the wastewater W subjected to the nitrification treatment in the reaction tank 10 may be subjected to the denitrification treatment. In this manner, the wastewater treatment system 1 may perform any air amount control of the amount of air supplied to the reaction tank 10 based on a result of measurement by the water quality measurement unit, other than the above-described simultaneous nitrification-denitrification control, dissolved oxygen amount control, and inflow water amount control. The wastewater treatment system 1 may be classified into lines in which different processes are performed (for example, a line through which the simultaneous nitrification-denitrification control is performed and a line through which the dissolved oxygen amount control is performed), and each of the reaction tanks 10 may perform one of the processes (for example, one of the line through which the simultaneous nitrification-denitrification control is performed and the line through which the dissolved oxygen amount control is performed).

(Configuration of Control Unit)

Figure 2:
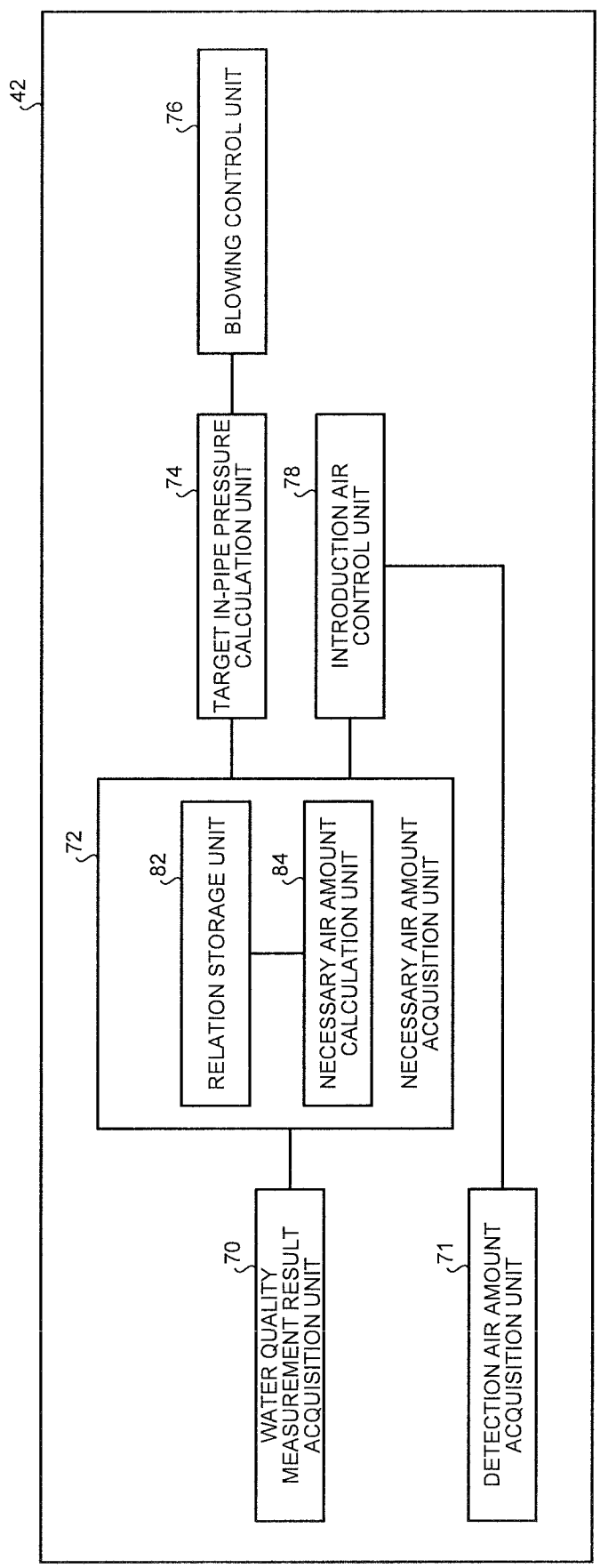
FIG. 2 is a block diagram illustrating the configuration of a control unit according to the first embodiment.

The following describes the controller 42 included in the air supply amount controller 40. FIG. 2 is a block diagram illustrating the configuration of the control unit according to the first embodiment. The controller 42 is an arithmetic device such as a computer. As illustrated in FIG. 2, the controller 42 includes a water quality measurement result acquisition unit 70, a detection air amount acquisition unit 71, a necessary air amount acquisition unit 72, a target in-pipe pressure calculation unit 74, a blowing control unit 76, and an introduction air control unit 78.

The water quality measurement result acquisition unit 70 acquires a result of measurement of the state of the wastewater W in the reaction tank 10, in other words, the nitrate concentration and ammonia concentration of the wastewater W from the nitrate meter 43 and the ammonia meter 44. In a case where the water quality measurement unit is a dissolved oxygen meter, the water quality measurement result acquisition unit 70 acquires the amount of dissolved oxygen in the reaction tank 10 as the state of the wastewater W. In a case where the water quality measurement unit is a flow meter, the water quality measurement result acquisition unit 70 acquires the amount of the wastewater W having flowed into the reaction tank 10 as the state of the wastewater W. Thus, the state of the wastewater W in the reaction tank 10 is a measurement target measured by the water quality measurement unit. In other words, the water quality measurement unit measures, as the state of the wastewater W, at least one of the nitrate concentration, the ammonia concentration, the amount of dissolved oxygen, and the inflow amount of the wastewater W in the reaction tank 10.

The detection air amount acquisition unit 71 acquires, from the branch pipe air amount measurement unit 48, the value of the detection air amount of each branch pipe 34, in other words, the value of the amount of air supplied from the introduction valve 36 of the branch pipe 34 to the reaction tank 10.

The necessary air amount acquisition unit 72 acquires, for each of the reaction tanks 10 based on the measurement result of the state of the wastewater W acquired by the water quality measurement result acquisition unit 70, a necessary air amount for achieving a predetermined target water quality of the wastewater W in the reaction tank 10. The method of acquiring the necessary air amount will be described later.

The target in-pipe pressure calculation unit 74 calculates a target in-pipe pressure based on the value of the necessary air amount. The target in-pipe pressure is the pressure of air in the blowing pipe, which is necessary for supplying the necessary amount of air to each of the reaction tanks 10. The method of calculating the target in-pipe pressure will be described later.

The blowing control unit 76 controls air supply from the blower unit 20 so that the pressure in the blowing pipe 30 becomes equal to the target in-pipe pressure calculated by the target in-pipe pressure calculation unit 74. Specifically, the blowing control unit 76 acquires the value of air pressure in the header pipe 32, which is measured by the header in-pipe pressure measurement unit 47, and controls air supply from the blower unit 20 amount so that the air pressure in the header pipe 32 becomes equal to the target in-pipe pressure.

The introduction air control unit 78 acquires, from the detection air amount acquisition unit 71, the value of the amount of air supplied to each branch pipe 34, which is measured by the branch pipe air amount measurement unit 48. More specifically, the introduction air control unit 78 acquires the value of the detection air amount of each branch pipe 34, in other words, the value of the amount of air supplied from the introduction valve 36 of the branch pipe 34 to the reaction tank 10. The introduction air control unit 78 adjusts the opening degree of each introduction valve 36 so that the amount of air supplied from the branch pipe 34 to the reaction tank 10 becomes equal to the necessary air amount, based on the necessary air amount and the acquired detection air amount. In other words, the introduction air control unit 78 adjusts the opening degree of each introduction valve 36 so that the detection air amount matches with the necessary air amount. The method of adjusting the opening degree of the introduction valve 36 will be described later.

(Acquisition of Necessary Air Amount)

The following describes the method of acquisition of the necessary air amount by the necessary air amount acquisition unit 72. The necessary air amount acquisition unit 72 includes a relation storage unit 82 and a necessary air amount calculation unit 84. Hereinafter, a water quality refers to the concentration or amount of a predetermined component contained in the wastewater W, and is the nitrate concentration and ammonia concentration of the wastewater W in the present embodiment. Alternatively, the water quality may be, for example, the amount of dissolved oxygen of the wastewater W.

The relation storage unit 82 stores a water-quality air-amount relation. The water-quality air-amount relation is a relation between the amount of air supplied to the reaction tank 10 and a change amount of the water quality in the reaction tank 10 in a case where the amount of air is supplied. The relation storage unit 82 stores the water-quality air-amount relation as a primary delay system in which change of the water quality in the reaction tank 10 is delayed from change of the amount of air supplied to the reaction tank 10. Specific description is given below.

Figure 3:
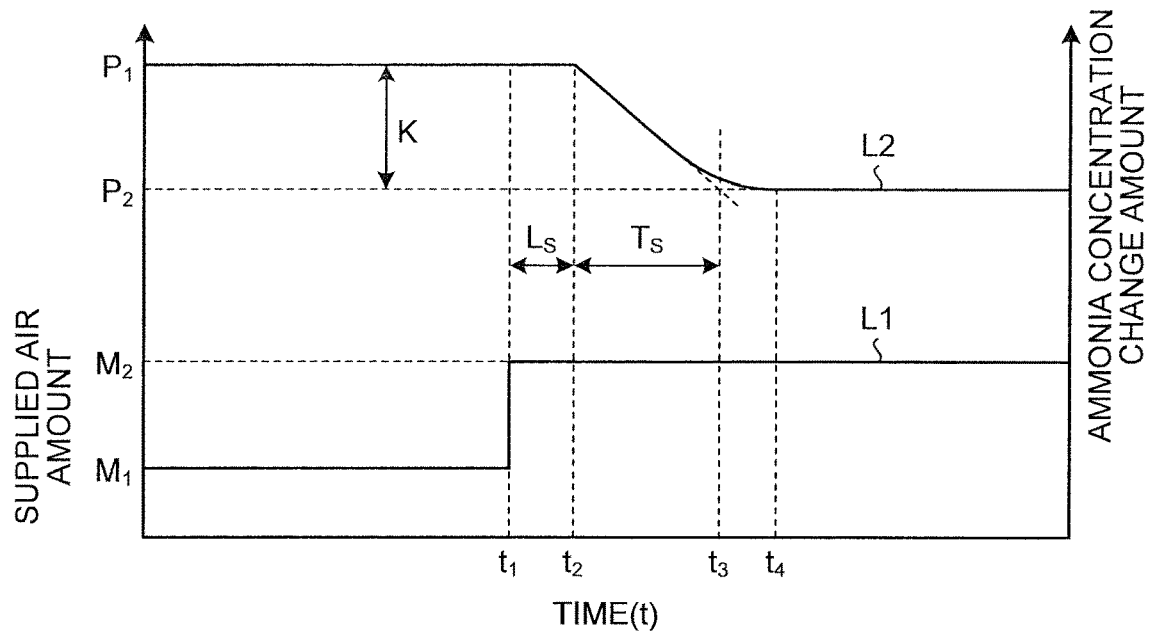
FIG. 3 is a graph for describing a water-quality air-amount relation.

FIG. 3 is a graph for describing the water-quality air-amount relation. FIG. 3 is a graph illustrating an exemplary change amount of the ammonia concentration when air is supplied to the reaction tank 10. In FIG. 3, the horizontal axis represents time, the vertical axis on the left side represents a supply amount of air supplied to the reaction tank 10, and the vertical axis on the right side represents the ammonia concentration of the wastewater W in the reaction tank 10. In FIG. 3, Line Segment L1 illustrates the amount of supplied air at each time. Line Segment L2 illustrates the ammonia concentration at each time in a case where the ammonia concentration is changed in accordance with the water-quality air-amount relation along with change of the amount of supplied air as in Line Segment L1.

As illustrated with Line Segment L1, the amount of supplied air is increased from $M_1$ to $M_2$ at Time $t_1$ in the example illustrated in FIG. 3. As illustrated with Line Segment L2, according to the water-quality air-amount relation, the ammonia concentration remains at Concentration $P_1$ from Time $t_1$ to delayed Time $t_2$, starts decreasing at Time $t_2$, decreases at a constant speed until Time $t_3$. A decrease speed of the ammonia concentration decreases from Time $t_3$, and the ammonia concentration reaches Concentration $P_2$ at Time $t_4$, and converges at Concentration $P_2$. The change value of the amount of supplied air when the amount of supplied air is changed from $M_1$ to $M_2$ is treated as a unit change amount of the supply air (the air change amount is, for example, 1 m$^3$). The change amount of concentration from the ammonia concentration $P_1$ to $P_2$ in this case, in other words the change amount of the water quality after the convergence in the case where the amount of supplied air is changed by the unit amount, is represented by K. The duration from Time $t_1$ to $t_2$, in other words, waste time is represented by Ls. The duration from Time $t_2$ to $t_3$, in other words, primary delay time is represented by Ts. A transfer function of the ammonia concentration related to the amount of supplied air and time is represented by y, then the water-quality air-amount relation is represented by Expression (11) below.

$$y=(K \cdot e^{-Ls})/(1+Ts) \tag{11}$$

The relation storage unit 82 stores the water-quality air-amount relation obtained by substituting the values of K, Ls, and Ts measured in advance into the above-described Expression (11). For example, the relation storage unit 82 stores, based on a result of detection in the duration from Time $t_2$ to $t_4$, a predetermined ratio (in this example, 63%) of the detected duration as Ts which representing the duration from Time $t_2$ to $t_3$. Although the relation between the ammonia concentration and the amount of supplied air is described in this example, the water-quality air-amount relation is applicable to the relation between each water quality and the amount of supplied air such as the relation between the nitrate concentration and the amount of supplied air, or the relation between the amount of dissolved oxygen and the amount of supplied air as long as the values of K, Ls, and Ts are measured in advance. The relation storage unit 82 in the present embodiment stores different water-quality air-amount relations for the relation between the ammonia concentration and the amount of supplied air, and the relation between the nitrate concentration and the amount of supplied air, respectively.

The necessary air amount calculation unit 84 illustrated in FIG. 2 reads the water-quality air-amount relation from the relation storage unit 82. Then, the necessary air amount calculation unit 84 acquires a predetermined target water quality of the wastewater W in the reaction tank 10, in this example, the target water quality is target concentrations as a target ammonia concentration value and a target nitrate concentration value. The target concentrations are constant numerical value ranges set in advance. For example, the target concentration of the nitrate concentration is a predetermined numerical value range equal to or smaller than 5.0 mg. For example, the target concentration of the ammonia concentration is 1.0 mg/L to 5.0 mg/L inclusive, more preferably 1.0 mg/L to 2.0 mg/L inclusive. The necessary air amount calculation unit 84 calculates the necessary air amount of the reaction tank 10 based on the water-quality air-amount relation, the target concentrations, and the current nitrate concentration and ammonia concentration of the wastewater W acquired by the water quality measurement result acquisition unit 70. The necessary air amount calculation unit 84 calculates the necessary air amount of the reaction tank 10 so that the nitrate concentration of the wastewater W becomes equal to the target concentration thereof and the ammonia concentration of the wastewater W becomes equal to the target concentration thereof. The necessary air amount is an air amount necessary (and sufficient) for achieving the predetermined target water quality of the reaction tank, in other words, for achieving target concentrations of the ammonia concentration and nitrate concentration of the wastewater W in the reaction tank, and the necessary air amount is calculated as an absolute value.

Specifically, the necessary air amount calculation unit 84 calculates a differential concentration as the difference between target concentration and the corresponding concentration calculated by the water quality measurement result acquisition unit 70. The necessary air amount calculation unit 84 calculates the necessary air amount so that the ammonia concentration of the wastewater W changes toward the target concentration thereof by the differential concentration thereof and the nitrate concentration of the wastewater W changes toward the target concentration thereof by the differential concentration thereof. Thus, the necessary air amount changes in accordance with the values of the differential concentrations. For example, regarding the ammonia concentration, in a case where the calculated ammonia concentration is lower than the target concentration thereof, the more the differential concentration increases, in other words the more the current ammonia concentration decreases, the more the necessary air amount calculation unit 84 reduces the necessary air amount, determining that the progression of the nitrification treatment is too much. In a case where the calculated ammonia concentration is higher than the target concentration, the more the differential concentration increases, in other words the more the current ammonia concentration increases, the more the necessary air amount calculation unit 84 increases the necessary air amount, determining that the progression of the nitrification treatment is insufficient. Regarding the nitrate concentration, in a case where the calculated nitrate concentration is lower than the target concentration thereof, the more the differential concentration increases, in other words the more the current nitrate concentration decreases, the more the necessary air amount calculation unit 84 increases the necessary air amount, determining that the progression of the nitrification treatment is insufficient. In a case where the calculated nitrate concentration is higher than the target concentration, the more the differential concentration increases, in other words the more the current nitrate concentration increases, the more the necessary air amount calculation unit 84 decreases the necessary air amount, determining that the progression of the denitrification treatment is insufficient.

The necessary air amount calculation unit 84 calculates the necessary air amount for all reaction tanks 10. The necessary air amount calculation unit 84 may sum the calculated necessary air amounts of all reaction tanks 10, and calculate the sum as a total necessary air amount. Since the necessary air amount changes based on the current state of the wastewater W in the reaction tank 10, in other words, the nitrate concentration and the ammonia concentration, the total necessary air amount changes based on the current state of the wastewater W in the reaction tanks 10.

When the above-described dissolved oxygen amount control is performed, the necessary air amount calculation unit 84 reads the water-quality air-amount relation indicating the relation between the amount of dissolved oxygen and the amount of supplied air. The necessary air amount calculation unit 84 calculates the necessary air amount of each of the reaction tanks 10 so that a predetermined target water quality (target dissolved oxygen amount) of the wastewater W is achieved based on the current amount of dissolved oxygen of the wastewater W acquired by the water quality measurement result acquisition unit 70. When the above-described inflow water amount control is performed, the necessary air amount calculation unit 84 calculates the necessary air amount for achieving the target water quality in accordance with the inflow amount of the wastewater W to each of the reaction tanks 10. Since the necessary air amount for achieving the target water quality has a relation in accordance with the inflow amount of the wastewater W to the reaction tank 10, the necessary air amount calculation unit 84 stores the relation, and calculates the necessary air amount based on the inflow amount of the wastewater W acquired by the water quality measurement result acquisition unit 70.

(Calculation of Target in-Pipe Pressure)

The following describes the method of calculation of the target in-pipe pressure by the target in-pipe pressure calculation unit 74. The target in-pipe pressure calculation unit 74 acquires the value of the necessary air amount from the necessary air amount calculation unit 84, and calculates a blowing pipe loss pressure based on the value of the necessary air amount. The blowing pipe loss pressure is a pressure of air lost due to a pressure loss in the blowing pipe 30 in a case where the necessary amount of air is supplied into the blowing pipe 30. In other words, the blowing pipe loss pressure is a value equal to a pressure loss in the blowing pipe 30 in a case where the necessary amount of air is supplied into the blowing pipe 30. Then, the target in-pipe pressure calculation unit 74 calculates the target in-pipe pressure based on the blowing pipe loss pressure. The target in-pipe pressure changes in accordance with the value of the necessary air amount. In other words, the target in-pipe pressure calculation unit 74 changes the calculated target in-pipe pressure in accordance with change of the necessary air amount.

More detailed description is made below. A pressure loss H of a pipe is typically calculated by Expressions (12) and (13) below.

$$H = 4 \cdot f_1 \cdot (l/d) \cdot (\gamma \cdot v^2 / 2) \tag{12}$$

$$H = f_2 \cdot (\gamma \cdot v^2 / 2) \tag{13}$$

Expression (12) is a calculation formula of the pressure loss H when the pipe is a straight pipe. Expression (13) is a calculation formula of the pressure loss H when the pipe is a deformed pipe other than a straight pipe. The values $f_1$ and $f_2$ represent loss coefficients and are predetermined constants. For example, the pressure loss of the pipe is measured in advance, and the values $f_1$ and $f_2$ are calculated based on a result of the measurement in advance. The value l is the pipe length (m) of the straight pipe, and the value d is the inner diameter (m) of the straight pipe. These values are constants predetermined based on the shape of the pipe. The value $\gamma$ is an air density (kg/m³) and is a predetermined constant. The value v is the flow speed (m/s) of flowing air. Thus, the flow speed v is a variable in Expressions (12) and (13). Accordingly, the pressure loss H of the pipe changes in accordance with the flow speed v. The flow speed v is proportional to a flow rate Q of air as in Expression (14) below (Bernoulli's theorem). The value A in Expression (14) is a flow path area, and is a constant predetermined based on the shape of the pipe.

$$Q = A \cdot v \tag{14}$$

Thus, the pressure loss H of the pipe can be calculated from the flow rate Q of air. In the present embodiment, the pressure loss H corresponds to the blowing pipe loss pressure, and the flow rate Q corresponds to the necessary air amount. The target in-pipe pressure calculation unit 74 calculates, based on Expression (14), the flow speed v of air in a case where the necessary amount of air is supplied to the header pipe 32 and each branch pipe 34. The flow speed v is a flow speed in the header pipe 32 and the branch pipe 34. Then, as indicated by Expressions (12) and (13), the target in-pipe pressure calculation unit 74 sets predetermined values to terms other than the flow speed v upon the calculation of the pressure loss of the pipe, and calculates a blowing pipe loss pressure $H_P$ based on the flow speed v and the set values. The value of the blowing pipe loss pressure $H_P$ changes proportionally to the flow speed v, in other words, change of the necessary air amount.

The target in-pipe pressure calculation unit 74 calculates the blowing pipe loss pressure $H_P$ for each branch pipe 34. Specifically, in the present embodiment, the target in-pipe pressure calculation unit 74 calculates, as the blowing pipe loss pressures $H_P$, a blowing pipe loss pressure $H_{PA}$ of the branch pipe 34A, a blowing pipe loss pressure $H_{PB}$ of the branch pipe 34B, and a blowing pipe loss pressure $H_{PC}$ of the branch pipe 34C.

The blowing pipe loss pressure $H_{PA}$ is a pressure loss in a case where the necessary amount of air calculated for the reaction tank 10A is supplied to a path of the blowing pipe 30 extending from the blower unit 20 to the reaction tank 10A. More specifically, the blowing pipe loss pressure $H_{PA}$ is a pressure loss of a path extending from the entrance of the header pipe 32 (connection part between the header pipe 32 and the introduction pipe 31) to the exit of the branch pipe 34A (connection part the branch pipe 34A and the diffuser 12) when the total necessary amount of air is supplied to a path extending from the entrance of the header pipe 32 to the exit of the header pipe 32 (connection part between the header pipe 32 and the branch pipe 34A) and the necessary amount of air calculated for the reaction tank 10A is supplied to a path extending from the entrance of the branch pipe 34A (connection part between the header pipe 32 and the branch pipe 34A) to the exit of the branch pipe 34A.

The blowing pipe loss pressure $H_{PB}$ is a pressure loss in a case where the necessary amount of air calculated for the reaction tank 10B is supplied to a path of the blowing pipe 30 extending from the blower unit 20 to the reaction tank 10B. More specifically, the blowing pipe loss pressure $H_{PB}$ is a pressure loss of a path extending from the entrance of the header pipe 32 (connection part between the header pipe 32 and the introduction pipe 31) to the exit of the branch pipe 34B (connection part between the branch pipe 34B and the diffuser 12) when the total necessary amount of air is supplied to a path extending from the entrance of the header pipe 32 to the exit of the header pipe 32 (connection part between the header pipe 32 and the branch pipe 34B) and the necessary amount of air calculated for the reaction tank 10B is supplied to a path extending from the entrance of the branch pipe 34B (connection part between the header pipe 32 and the branch pipe 34B) to the exit of the branch pipe 34B.

The blowing pipe loss pressure $H_{PC}$ is a pressure loss in a case where the necessary amount of air calculated for the reaction tank 10C is supplied to a path of the blowing pipe 30 extending from the blower unit 20 to the reaction tank 10C. More specifically, the blowing pipe loss pressure $H_{PC}$ is a pressure loss of a path extending from the entrance of the header pipe 32 (connection part between the header pipe 32 and the introduction pipe 31) to the exit of the branch pipe 34C (connection part between the branch pipe 34C and the diffuser 12) when the total necessary air amount is supplied to a path extending from the entrance of the header pipe 32 to the exit of the header pipe 32 (connection part between the header pipe 32 and the branch pipe 34C) and the necessary amount of air calculated for the reaction tank 100 is supplied to a path extending from the entrance of the branch pipe 34C (connection part between the header pipe 32 and the branch pipe 34C) to the exit of the branch pipe 34C. However, the blowing pipe loss pressure $H_{PA}$, the blowing pipe loss pressure $H_{PB}$, and the blowing pipe loss pressure $H_{PC}$ may be pressure losses of paths from the entrance of the introduction pipe 31 (place connected with the blowers 22) to the exits of the branch pipes 34A, 34B, and 34C, respectively.

Then, the target in-pipe pressure calculation unit 74 calculates a target in-pipe pressure $P_Y$ based on Expression (15) below.

$$P_Y = h + H_C + H_P + H_M H_A \tag{15}$$

In the expression, h is the water head pressure of the wastewater W in the reaction tank 10. The value $H_C$ is the pressure of air lost due to a pressure loss (passing resistance) of an air filter (not illustrated) provided to each blower 22. The value $H_M$ is the pressure of air lost due to a pressure loss (passing resistance) of the branch pipe air amount measurement unit 48. The $H_A$ is the pressure of air lost due to a pressure loss (passing resistance) of the diffuser 12. The target in-pipe pressure calculation unit 74 sums the blowing pipe loss pressure $H_P$, the water head pressure h, the air filter loss pressure $H_C$, the branch pipe air amount measurement unit loss pressure $H_M$, and the diffuser loss pressure $H_A$, and calculates the sum as the target in-pipe pressure $P_Y$. However, for example, the target in-pipe pressure calculation unit 74 may sum the blowing pipe loss pressure $H_P$, the water head pressure h, the branch pipe air amount measurement unit loss pressure $H_M$, and the diffuser loss pressure $H_A$, and may calculate the target in-pipe pressure $P_Y$ so that the target in-pipe pressure $P_Y$ is equal to or larger than the sum.

The water head pressure h may be a value set based on the volume of each of the reaction tanks 10 in advance. The reaction tank 10 may be provided with a sensor configured to detect the water level or water amount of the wastewater W in the reaction tank 10, and the target in-pipe pressure calculation unit 74 may calculate the water head pressure h based on this detected value. The air filter loss pressure $H_C$, the branch pipe air amount measurement unit loss pressure $H_M$, and the diffuser loss pressure $H_A$ are, for example, designed values or values measured in advance. In other words, the target in-pipe pressure calculation unit 74 uses predetermined constants of the air filter loss pressure $H_C$, the branch pipe air amount measurement unit loss pressure $H_M$, and the diffuser loss pressure $H_A$, and if there are values measured in advance, uses the measured values. The target in-pipe pressure calculation unit 74 uses predetermined values such as constants or calculation values of the terms other than $H_P$ in this manner, sums the blowing pipe loss pressure $H_P$ and the predetermined values, and calculates the sum as the target in-pipe pressure $P_Y$.

More specifically, the target in-pipe pressure calculation unit 74 calculates the target in-pipe pressure for each of the reaction tanks 10, and sets a maximum target in-pipe pressure among the calculated target in-pipe pressures as the target in-pipe pressure $P_Y$. In the present embodiment, the target in-pipe pressure calculation unit 74 calculates a target in-pipe pressure $P_{YA}$, a target in-pipe pressure $P_{YB}$, and a target in-pipe pressure $P_{YC}$. The target in-pipe pressure $P_{YA}$ is the sum of the blowing pipe loss pressure $H_{PA}$, the water head pressure h of the reaction tank 10A, the air filter loss pressure $H_C$, the branch pipe air amount measurement unit loss pressure $H_M$ of the branch pipe air amount measurement unit 48 in the branch pipe 34A, and the diffuser loss pressure $H_A$ of the diffuser 12 in the reaction tank 10A. Similarly, the target in-pipe pressure $P_{YB}$ is the sum of the blowing pipe loss pressure $H_{PB}$, the water head pressure h of the reaction tank 10B, the air filter loss pressure $H_C$, the branch pipe air amount measurement unit loss pressure $H_M$ of the branch pipe air amount measurement unit 48 in the branch pipe 34B, and the diffuser loss pressure $H_A$ of the diffuser 12 in the reaction tank 10B. Similarly, the target in-pipe pressure $P_{YC}$ is the sum of the blowing pipe loss pressure $H_{PC}$, the water head pressure h of the reaction tank 10C, the air filter loss pressure $H_C$, the branch pipe air amount measurement unit loss pressure $H_M$ of the branch pipe air amount measurement unit 48 in the branch pipe 34C, and the diffuser loss pressure $H_A$ of the diffuser 12 in the reaction tank 10C. The target in-pipe pressure calculation unit 74 determines a maximum value among the target in-pipe pressure $P_{YA}$, the target in-pipe pressure $P_{YB}$, and the target in-pipe pressure $P_{YC}$ as the target in-pipe pressure $P_Y$. The target in-pipe pressure calculation unit 74 may add a predetermined margin to this determined target in-pipe pressure $P_Y$, and determine a value as a result of the addition to be the actual target in-pipe pressure $P_Y$.

The target in-pipe pressure calculation unit 74 may use the sum of values other than the blowing pipe loss pressure $H_P$, such as the water head pressure h, the air filter loss pressure $H_C$, the branch pipe air amount measurement unit loss pressure $H_M$, and the diffuser loss pressure $H_A$, as a value (predetermined value J) common to each of the reaction tanks 10, and calculate the target in-pipe pressure $P_{YA}$, the target in-pipe pressure $P_{YB}$, and the target in-pipe pressure $P_{YC}$. Specifically, the target in-pipe pressure calculation unit 74 may calculate the target in-pipe pressure $P_{YA}$ as the sum of the blowing pipe loss pressure $H_{PA}$ and the predetermined value J, calculate the target in-pipe pressure $P_{YB}$ as the sum of the blowing pipe loss pressure $H_{PB}$ and the predetermined value J, calculate the target in-pipe pressure $P_{YC}$ as the sum of the blowing pipe loss pressure $H_{PC}$ and the predetermined value J, and determine the target in-pipe pressure $P_Y$ to be a maximum value among the blowing pipe loss pressures. Alternatively, the target in-pipe pressure calculation unit 74 may use a predetermined value J1 as any value other than the blowing pipe loss pressure $H_P$ and the water head pressure h, and calculate the target in-pipe pressure $P_{YA}$ to be the sum of the water head pressure h of the reaction tank 10A, the blowing pipe loss pressure $H_{PA}$, and the predetermined value J1. In this case, the target in-pipe pressure $P_{YB}$ and the target in-pipe pressure $P_{YC}$ are each calculated in a similar manner.

As described above, the target in-pipe pressure calculation unit 74 calculates the blowing pipe loss pressures $H_{PA}$, $H_{PB}$, and $H_{PC}$ for each branch pipe 34 (for each path to each of the reaction tanks 10), and calculates the target in-pipe pressures $P_{YA}$, $P_{YB}$, and $P_{YC}$ for each branch pipe 34 based on the blowing pipe loss pressures $H_{PA}$, $H_{PB}$, and $H_{PC}$. The target in-pipe pressure calculation unit 74 sets the maximum value among the target in-pipe pressures $P_{YA}$, $P_{YB}$, and $P_{YC}$ calculated for each branch pipe 34 as the target in-pipe pressure $P_Y$ to be.

Figure 4:
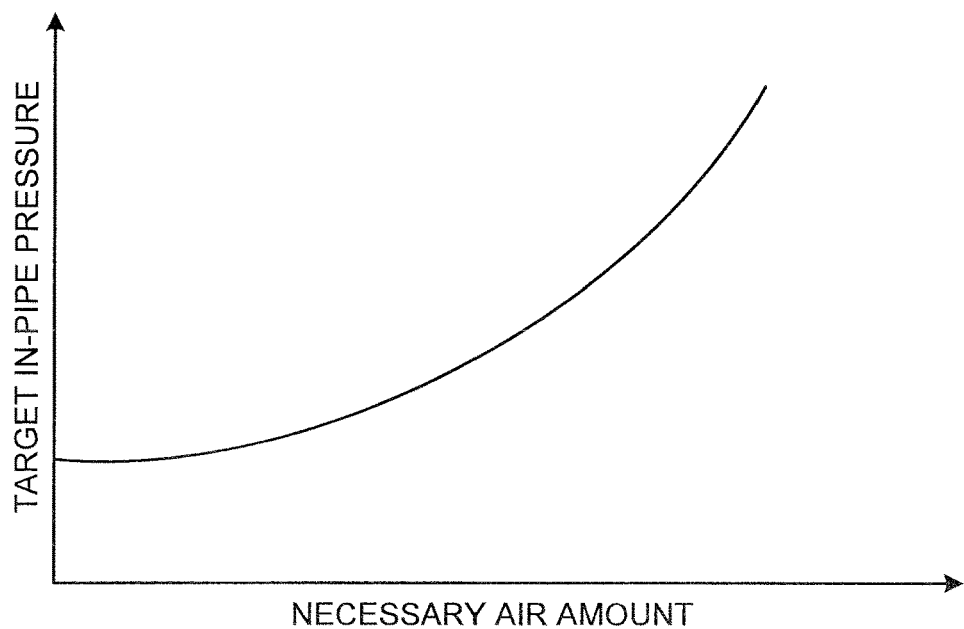
FIG. 4 is a graph illustrating an exemplary relation between a necessary air amount and a target in-pipe pressure.

FIG. 4 is a graph illustrating an exemplary relation between a necessary air amount and a target in-pipe pressure. As described above, the target in-pipe pressure calculation unit 74 calculates the blowing pipe loss pressure $H_P$ of the blowing pipe 30 in a case where the necessary amount of air is supplied to the blowing pipe 30, and calculates the target in-pipe pressure $P_Y$ based on the blowing pipe loss pressure $H_P$. The blowing pipe loss pressure $H_P$ changes in accordance with the value of the necessary air amount. Thus, as illustrated in FIG. 4, the target in-pipe pressure $P_Y$ changes in accordance with the value of the necessary air amount. As illustrated in FIG. 4, the target in-pipe pressure $P_Y$ changes parabolically proportionally to the value of the necessary air amount.

The blowing control unit 76 illustrated in FIG. 2 controls air supply from the blower unit 20 so that the pressure in the blowing pipe 30 becomes equal to the target in-pipe pressure $P_Y$ calculated by the target in-pipe pressure calculation unit 74. Accordingly, the pressure in the blowing pipe 30 (header pipe 32) is maintained at the target in-pipe pressure $P_Y$, and follows change of the calculation value of the target in-pipe pressure $P_Y$. The pressure in the blowing pipe 30 is a pressure at a position where the pressure is measured, in other words, a position where the header in-pipe pressure measurement unit 47 measures the pressure of the blowing pipe 30. The target in-pipe pressure $P_Y$ is a target in-pipe pressure at a position where the pressure is measured.

(Adjustment of Introduction Valve Opening Degree)

The following describes adjustment of the opening degree of the introduction valve 36 by the introduction air control unit 78. The introduction air control unit 78 acquires the value of the detection air amount of each branch pipe 34, in other words, the amount of air supplied from the introduction valve 36 of the branch pipe 34 to the reaction tank 10. The introduction air control unit 78 adjusts the opening degree of the introduction valve 36 so that the amount of air supplied from the branch pipe 34 to the reaction tank 10 becomes equal to the necessary air amount based on the necessary air amount and the acquired detection air amount. Specifically, when the amount of air in the branch pipe 34 is larger than the necessary air amount, the introduction air control unit 78 decreases the opening degree of the introduction valve 36 (decreases the opening area) to prevent the amount of air flowing into the reaction tank 10 from becoming too large. The introduction air control unit 78 increases the opening degree of the introduction valve 36 (increases the opening area) when the necessary air amount has varied and increased. The introduction air control unit 78 decreases the opening degree of the introduction valve 36 when the necessary air amount has decreased.

In the present embodiment, the pressure of the blowing pipe 30 is controlled to be equal to the target in-pipe pressure $P_Y$. Thus, an air amount equal to or larger than the total necessary air amount is supplied to the header pipe 32. The introduction air control unit 78 adjusts the opening degree of the introduction valve 36 of each branch pipe 34 to distribute air in the header pipe 32 to the branch pipes 34 so that the necessary amount of air is supplied to each branch pipe 34. Accordingly, when, for example, the length and the shape are different between the branch pipes 34 and the pressure loss is different between the branch pipes 34, the opening degree of the introduction valve 36 is adjusted for each branch pipe 34, and thus the necessary amount of air can be appropriately supplied to the branch pipe 34. In the present embodiment, the blowing control unit 76 changes the in-pipe pressure in the blowing pipe 30 in accordance with the necessary air amount to supply air so that an air amount following the necessary air amount is achieved. Thus, the introduction air control unit 78 adjusts the opening degree of the introduction valve 36 by an amount smaller than that when the target in-pipe pressure is constant. In other words, an air amount close to a minimum necessary amount is constantly supplied to the blowing pipe 30, and thus the introduction air control unit 78 can control the opening degree of the introduction valve 36 while avoiding an opening degree of the introduction valve 36 that is too small.

Figure 5:
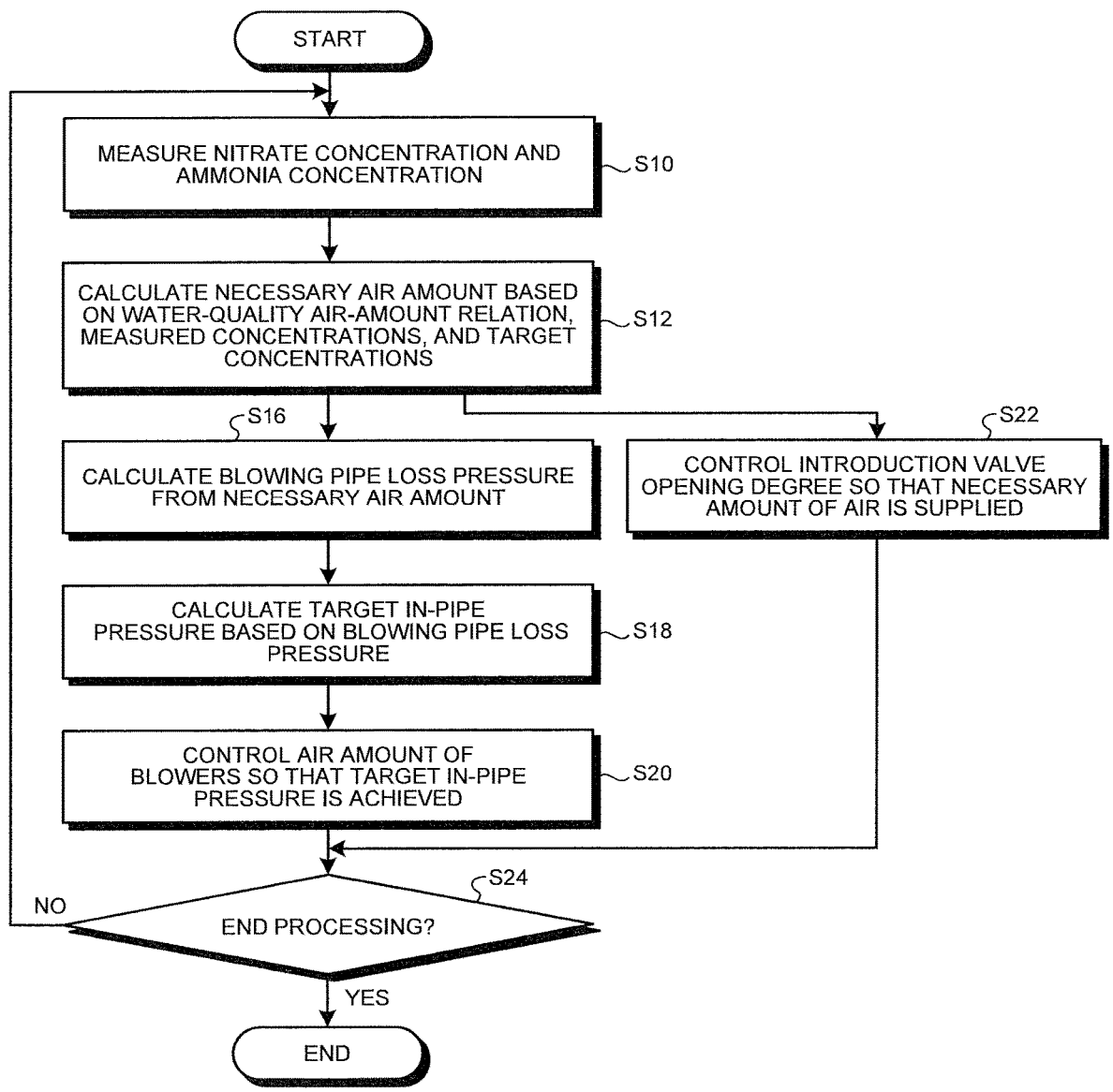
FIG. 5 is a flowchart for describing a control process of adjusting the pressure in a blowing pipe to a target in-pipe pressure and supplying a necessary amount of air to each of the reaction tanks.

A control process of adjusting the pressure in the blowing pipe 30 to the target in-pipe pressure and supplying the necessary amount of air to each of the reaction tanks 10 as described above will be described with reference to a flowchart. FIG. 5 is a flowchart for describing the control process of adjusting the pressure in the blowing pipe to the target in-pipe pressure and supplying the necessary amount of air to each of the reaction tanks 10. As illustrated in FIG. 5, the air supply amount controller 40 first measures the nitrate concentration and ammonia concentration of the wastewater W in each of the reaction tanks 10 through the nitrate meter 43 and the ammonia meter 44 (step S10).

After having measured the nitrate concentration and the ammonia concentration, the air supply amount controller 40 calculates, through the necessary air amount calculation unit 84, the necessary air amount of each of the reaction tanks 10 based on the water-quality air-amount relation, the measured concentrations, and the target concentrations (step S12). Specifically, the necessary air amount calculation unit 84 reads the water-quality air-amount relation for each of the relation between the ammonia concentration and the amount of supplied air, and the relation between the nitrate concentration and the amount of supplied air from the relation storage unit 82. The necessary air amount calculation unit 84 acquires target concentrations of the ammonia concentration and the nitrate concentration. The necessary air amount of the reaction tank 10 is calculated so that the nitrate concentration of the wastewater W becomes equal to the target concentration thereof and the ammonia concentration of the wastewater W becomes equal to the target concentration thereof. The necessary air amount calculation unit 84 calculates the necessary air amount for all reaction tanks 10.

After having calculated the necessary air amount, the air supply amount controller 40 calculates, through the target in-pipe pressure calculation unit 74, the blowing pipe loss pressure $H_P$ from the necessary air amount (step S16) and calculates the target in-pipe pressure $P_Y$ based on the blowing pipe loss pressure $H_P$ (step S18). The target in-pipe pressure calculation unit 74 calculates the blowing pipe loss pressure $H_P$ to be the pressure loss of the blowing pipe 30 in a case where the necessary amount of air is supplied to the blowing pipe 30. Then, the target in-pipe pressure calculation unit 74 sums the blowing pipe loss pressure $H_P$ and the predetermined value J, and calculates the sum as the target in-pipe pressure $P_Y$. More specifically, the target in-pipe pressure calculation unit 74 calculates the target in-pipe pressure $P_{YA}$, the target in-pipe pressure $P_{YB}$, and the target in-pipe pressure $P_{YC}$ for each path to each of the reaction tanks 10, and sets the target in-pipe pressure $P_Y$ to be a maximum value among the target in-pipe pressures.

After having calculated the target in-pipe pressure $P_Y$, the air supply amount controller 40 controls, through the blowing control unit 76, air supply by the blowers 22 so that the pressure in the blowing pipe 30 becomes equal to the target in-pipe pressure $P_Y$ (step S20). The blowing control unit 76 adjusts the amount of air discharged from the blowers 22 by controlling the number of blowers 22 to be operated, the opening degree of the inlet vane of each blower 22, and the rotation speed of the blade part, thereby adjusting the air pressure in the header pipe 32 to the target in-pipe pressure. A specific control process of the blowing control unit 76 will be described later.

After having calculated the necessary air amount, the air supply amount controller 40 adjusts, through the introduction air control unit 78, the opening degree of the introduction valve 36 so that the necessary amount of air is supplied to each of the reaction tanks 10 (step S22). After steps S20 and S22, the air supply amount controller 40 proceeds to step S24, and returns to step S10 to repeat the same processing when the processing is not to be ended (No at step S24). Specifically, the air supply amount controller 40 measures the nitrate concentration and ammonia concentration of the wastewater W in each of the reaction tanks 10 at each predetermined time, updates the necessary air amount and the target in-pipe pressure based on a result of the measurement, and sequentially controls the amount of air discharged from the blowers 22 so that the updated target in-pipe pressure is achieved. The air supply amount controller 40 also sequentially controls the opening degree of the introduction valve 36 so that the updated necessary amount of air is supplied to the reaction tank 10. When the processing is to be ended at step S24 (Yes at step S24), the processing is ended.

In a case of the above-described dissolved oxygen amount control, the amount of dissolved oxygen in the reaction tank 10 is calculated at step S10, and the necessary air amount is calculated at step S12 so that the amount of dissolved oxygen becomes equal to a target amount (target water quality). Other processing in the control process is the same as in the above description.

(Control of Blower by Blowing Control Unit)

Figure 6:
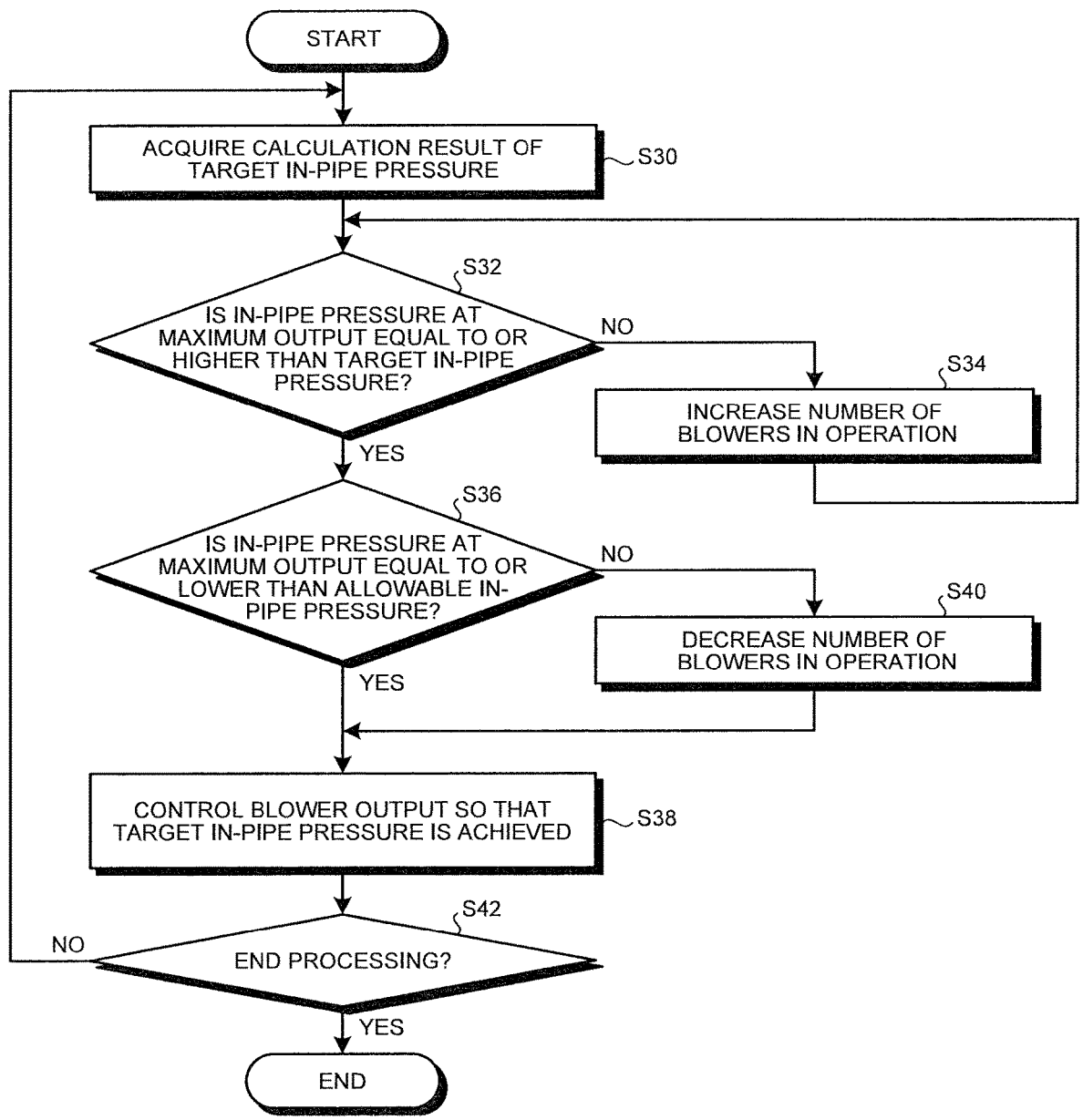
FIG. 6 is a flowchart for describing control of blowers by a blower control unit.
Figure 7:
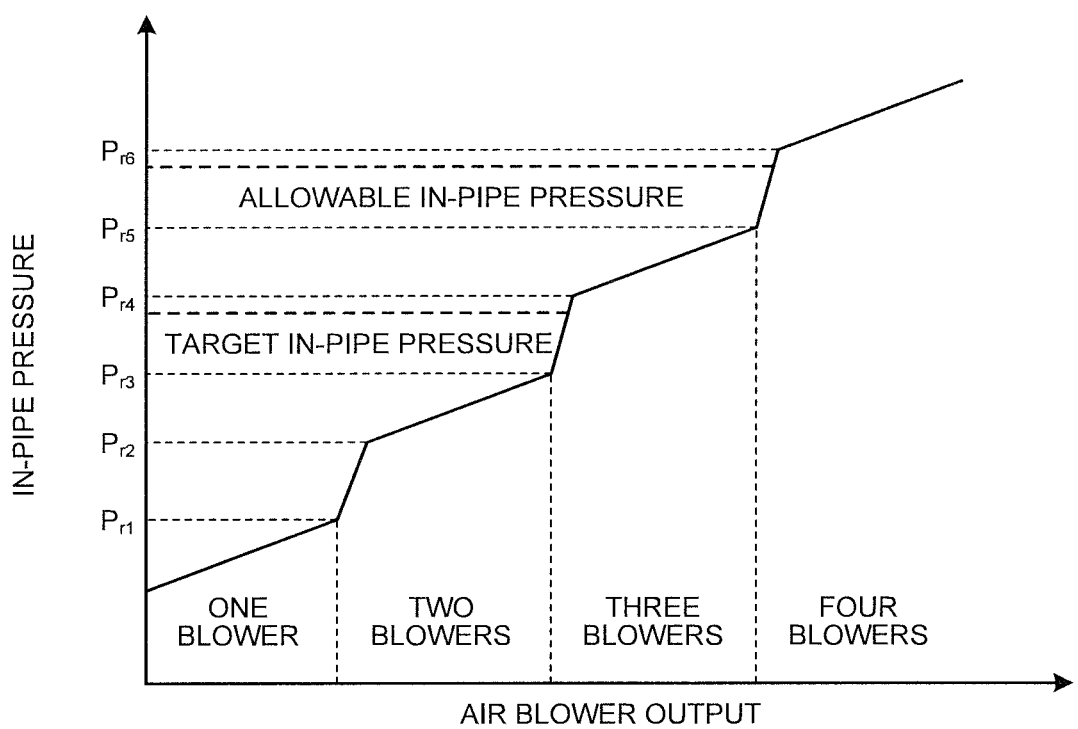
FIG. 7 is a graph for describing control of the blowers by the blowers.

The following describes control of the blowers 22 by the blowing control unit 76. FIG. 6 is a flowchart for describing control of the blowers by the blower control unit. FIG. 7 is a graph for describing control of the blowers by the blowers. As illustrated in FIG. 6, the blowing control unit 76 first acquires the value of the target in-pipe pressure from the target in-pipe pressure calculation unit 74 (step S30).

The blowing control unit 76 determines whether the in-pipe pressure at maximum output of the blowers 22 is equal to or higher than the target in-pipe pressure (step S32). The maximum output of the blowers 22 is an output when the outputs of all blowers 22 currently in operation are maximized. More specifically, the maximum output is an output when the opening degree of the inlet vane of each blower 22 is maximized and the rotation speed of the blade part is maximized. In FIG. 7, the horizontal axis represents the output value of the blowers 22, and the vertical axis represents the in-pipe pressure of the blowing pipe 30. As illustrated in FIG. 7, the in-pipe pressure when one blower 22 is operational is an in-pipe pressure $Pr_1$ at the maximum output. The in-pipe pressure when two blowers 22 are operational increases to, for example, an in-pipe pressure $Pr_2$ at a rated output, and further increases to an in-pipe pressure $Pr_3$ as the maximum output is reached. The in-pipe pressure when three blowers 22 are operational increases to, for example, an in-pipe pressure $Pr_4$ at the rated output, and further increases to an in-pipe pressure $Pr_5$ as the maximum output is reached. The in-pipe pressure when four blowers 22 are operational increases to, for example, an in-pipe pressure $Pr_6$ at the rated output, and further increases as the maximum output is reached. In the example illustrated in FIG. 7, the target in-pipe pressure is a value between the in-pipe pressure $Pr_3$ and the in-pipe pressure $Pr_4$. An allowable in-pipe pressure is higher than the target in-pipe pressure, and is a value between the in-pipe pressure $Pr_5$ and the in-pipe pressure $Pr_6$ in the example illustrated in FIG. 7.

When the in-pipe pressure at the maximum output is not equal to or higher than the target in-pipe pressure (No at step S32), in other words, is lower than the target in-pipe pressure, the blowing control unit 76 increases the number of blowers 22 in operation (step S34). In the example illustrated in FIG. 7, the in-pipe pressure at the maximum output when two blowers 22 are operational is lower than the target in-pipe pressure, and in this case, the blowing control unit 76 sets the number of blowers 22 in operation to be three. After having increased the number of blowers 22 in operation, the blowing control unit 76 returns the control process to step S32 to determine whether the maximum output of the blowers 22 at the increased number of blowers 22 in operation is equal to or higher than the target in-pipe pressure.

When the in-pipe pressure at the maximum output is equal to or higher than the target in-pipe pressure (Yes at step S32), the blowing control unit 76 determines whether the in-pipe pressure at the maximum output of the blowers 22 is equal to or lower than the allowable in-pipe pressure (step S36). When the in-pipe pressure at the maximum output is equal to or lower than the allowable in-pipe pressure (Yes at step S36), the blowing control unit 76 does not change the number of blowers 22 in operation, and controls the output of the operational blowers 22 so that the in-pipe pressure becomes equal to the target in-pipe pressure (step S38). In the example illustrated in FIG. 7, the in-pipe pressure at the maximum output when three blowers 22 are operational is equal to or higher than the target in-pipe pressure, and equal to or lower than the allowable in-pipe pressure. In the example illustrated in FIG. 7, when three blowers 22 are operational, the output thereof is controlled to be lower than the rated output by controlling the opening degree of each inlet vane and the rotation speed of each blade part so that the in-pipe pressure becomes equal to the target in-pipe pressure.

When the in-pipe pressure at the maximum output is not equal to or lower than the allowable in-pipe pressure (No at step S36), in other words, when the in-pipe pressure is higher than the allowable in-pipe pressure, the number of blowers 22 in operation is decreased (step S40). In the example illustrated in FIG. 7, the in-pipe pressure at the maximum output when four blowers 22 are operational is lower than the allowable in-pipe pressure. In this case, the blowing control unit 76 changes the number of blowers 22 in operation to three. After having decreased the number of blowers 22 in operation, the blowing control unit 76 proceeds to step S38 to control the outputs of the operational blowers 22 so that the in-pipe pressure becomes equal to the target in-pipe pressure. After step S38, the blowing control unit 76 proceeds to step S42. When the processing is not to be ended (No at step S42), the blowing control unit 76 returns to step S30 to acquire information of the updated target in-pipe pressure and repeat the same processing so that the target in-pipe pressure is achieved. When the processing is to be ended (Yes at step S42), the blowing control unit 76 ends the processing.

As described above, the wastewater treatment system 1 according to the present embodiment includes: the reaction tanks 10 configured to perform biotreatment on the wastewater W; the blowing pipe 30 connected with the reaction tanks 10; the blower unit 20 configured to supply air for performing the biotreatment to the reaction tanks 10 through the blowing pipe 30; and the air supply amount controller 40 configured to control the amount of air supplied to each of the reaction tanks 10. The air supply amount controller 40 includes the water quality measurement unit (in the present embodiment, the nitrate meter 43 and the ammonia meter 44), the necessary air amount acquisition unit 72, the target in-pipe pressure calculation unit 74, and the blowing control unit 76. The water quality measurement unit is provided to the reaction tank 10 and measures the state of the wastewater W in the reaction tank 10 (in the present embodiment, the nitrate concentration and ammonia concentration of the wastewater W). The necessary air amount acquisition unit 72 acquires, for each of the reaction tanks 10 based on a measurement result by the water quality measurement unit, an necessary air amount for achieving a predetermined target water quality (in the present embodiment, a target concentration) of the wastewater W in the reaction tank 10. The target in-pipe pressure calculation unit 74 calculates the blowing pipe loss pressure $H_P$ as the pressure of air lost due to a pressure loss in the blowing pipe when the necessary amount of air is supplied into the blowing pipe 30. The target in-pipe pressure calculation unit 74 calculates the target in-pipe pressure $P_Y$ in the blowing pipe 30 based on the blowing pipe loss pressure $H_P$. The target in-pipe pressure calculation unit 74 changes the calculated target in-pipe pressure $P_Y$ in accordance with change of the necessary air amount.

The wastewater treatment system 1 measures the current state of wastewater W, calculates the necessary air amount for achieving the target water quality of the wastewater W, and calculates the blowing pipe loss pressure $H_P$ of the blowing pipe 30 when supplied with the necessary amount of air. The wastewater treatment system 1 controls the blower unit 20 so that the pressure in the blowing pipe 30 becomes equal to the target in-pipe pressure $P_Y$ calculated based on the blowing pipe loss pressure $H_P$. The wastewater treatment system 1 changes the target in-pipe pressure $P_Y$ in accordance with the necessary air amount, in other words, the current water quality. Accordingly, the wastewater treatment system 1 controls the in-pipe pressure based on the current water quality so that the blower unit 20 supplies a minimum necessary amount of air for the biotreatment.

Thus, the wastewater treatment system 1 can reduce energy consumption of sending air by reducing supply of air unnecessary for the biotreatment. In the wastewater treatment system 1, most of electric power consumption is made through blowing air by the blower unit 20, and thus the electric power consumption can be effectively reduced by reducing this blowing pressure. The wastewater treatment system 1 calculates the target in-pipe pressure $P_Y$ based on the necessary air amount to each of the reaction tanks 10, more specifically, calculates the target in-pipe pressure $P_Y$ based on the pressure loss of a pipe connected with each reaction tank 10. Thus, the wastewater treatment system 1 can appropriately supply the necessary amount of air to each of the reaction tanks 10 when the degree of the pressure loss is different between the pipes connected with the transfer tanks 10. Accordingly, the wastewater treatment system 1 according to the present embodiment can appropriately supply air to each of the reaction tanks 10 while reducing the energy consumption of sending air.

The target in-pipe pressure calculation unit 74 sums the blowing pipe loss pressure $H_P$, the pressure loss (diffuser loss pressure $H_A$) of the diffuser 12 provided in the reaction tank 10 and configured to diffuse, in the reaction tank 10, air from the blowing pipe 30, and the water head pressure h of the wastewater in the reaction tank 10, and calculates the target in-pipe pressure $P_Y$ so that the target in-pipe pressure $P_Y$ becomes equal to or larger than the sum. The target in-pipe pressure calculation unit 74 sets the target in-pipe pressure $P_Y$ to be equal to or larger than the sum of the blowing pipe loss pressure $H_P$, the diffuser loss pressure $H_A$, and the water head pressure h. Thus, the wastewater treatment system 1 can appropriately supply the necessary amount of air despite of the pressure losses of the blowing pipe 30 and the diffuser 12 and the water head pressure of the wastewater W.

The blowing pipe 30 includes the header pipe 32 connected with the blower unit 20, the branch pipes 34 branched from the header pipe 32 and connected with the reaction tanks 10, respectively, the introduction valve 36 provided to the branch pipe 34, and the branch pipe air amount measurement unit 48 configured to measure, as the detection air amount, the amount of air supplied to each branch pipe 34. The air supply amount controller 40 includes the introduction air control unit 78 configured to adjust the opening degree of the introduction valve 36 so that the detection air amount becomes equal to the necessary air amount at each branch pipe 34. In the present embodiment, the total necessary amount of air is appropriately supplied to the header pipe 32 by adjusting the pressure of the blowing pipe 30 to the target in-pipe pressure $P_Y$. In addition, the introduction air control unit 78 adjusts the opening degree of the introduction valve 36 of the branch pipe 34 to distribute air of the header pipe 32 to the branch pipes 34 so that the necessary amount of air is supplied to each branch pipe 34. Thus, the wastewater treatment system 1 can appropriately supply the necessary amount of air to each branch pipe 34 even if the pressure losses of the branch pipes 34 are different from each other.

The blowing control unit 76 controls at least one of the number of blowers 22 in operation, the opening degree of each inlet vane, and the rotation speed of each blade part. Thus, the wastewater treatment system 1 can appropriately adjust the in-pipe pressure of the blowing pipe 30 to the target in-pipe pressure.

The water quality measurement unit measures, as the state of the wastewater W in each of the reaction tanks 10, at least one of the concentration of nitrate-nitrogen, the concentration of ammoniac nitrogen, the amount of dissolved oxygen of the wastewater W in the reaction tank 10, and the inflow amount of the wastewater into the reaction tank. Thus, the wastewater treatment system 1 can appropriately calculate the necessary air amount.

The water quality measurement unit measures, as the water quality of the wastewater W in the reaction tank 10, at least one of the concentration of nitrate-nitrogen, the concentration of ammoniac nitrogen, and the amount of dissolved oxygen of the wastewater W, and the necessary air amount acquisition unit 72 calculates the necessary air amount so that the water quality of the wastewater W becomes equal to the target water quality. The wastewater treatment system 1 measures the water quality and calculates the necessary air amount so that the water quality becomes equal to the target value, and thus can more accurately calculate the necessary air amount. The wastewater treatment system 1 may perform the simultaneous nitrification-denitrification treatment. In the simultaneous nitrification-denitrification treatment, the nitrification treatment as aerobic treatment and the denitrification treatment as anaerobic treatment are performed in the same tank, and thus the variation of the amount of consumed oxygen is large and the variation of the necessary air amount is large. The large variation of the necessary air amount frequently leads to a small necessary air amount, and thus the energy consumption can be more largely reduced.

The necessary air amount acquisition unit 72 further includes the relation storage unit 82 and the necessary air amount calculation unit 84. The relation storage unit 82 stores the water-quality air-amount relation as the relation between the amount of air supplied to the reaction tank 10 and the change amount of the water quality (in this example, the nitrate concentration and the ammonia concentration) of the wastewater W when the amount of air is supplied. The necessary air amount calculation unit 84 calculates, as the necessary air amount, an air amount necessary for changing the water quality of the wastewater W to the target water quality based on the water-quality air-amount relation, a result of the water quality measurement by the water quality measurement unit, and the target water quality (in this example, the target concentrations). The necessary air amount calculation unit 84 calculates the necessary air amount based on the water-quality air-amount relation, and thus can more accurately calculate the necessary air amount.

The relation storage unit 82 stores the water-quality air-amount relation as the primary delay system in which the change of the water quality of the wastewater W is delayed from change of the amount of air supplied into the reaction tank 10. The necessary air amount calculation unit 84 updates the necessary air amount based on a result of the water quality measurement for each elapse of a predetermined time. The wastewater treatment system 1 calculates the necessary air amount as the primary delay system, and thus can predict a water quality change amount for each time. In addition, the wastewater treatment system 1 repeats calculation of the necessary air amount to update the calculation result, and thus can more accurately control the air supply amount based on the latest measurement result. In other words, the wastewater treatment system 1 can more accurately control the air supply amount by performing feed forward control.

Second Embodiment

The following describes a second embodiment. The wastewater treatment system 1 according to the second embodiment is different from that of the first embodiment in that an air supply amount controller 40A includes a differential air amount calculation unit 79A and corrects the in-pipe pressure of the blowing pipe 30 based on a differential air amount calculated by the differential air amount calculation unit 79A. In the second embodiment, description of any component identical to that of the first embodiment will be omitted.

Figure 8:
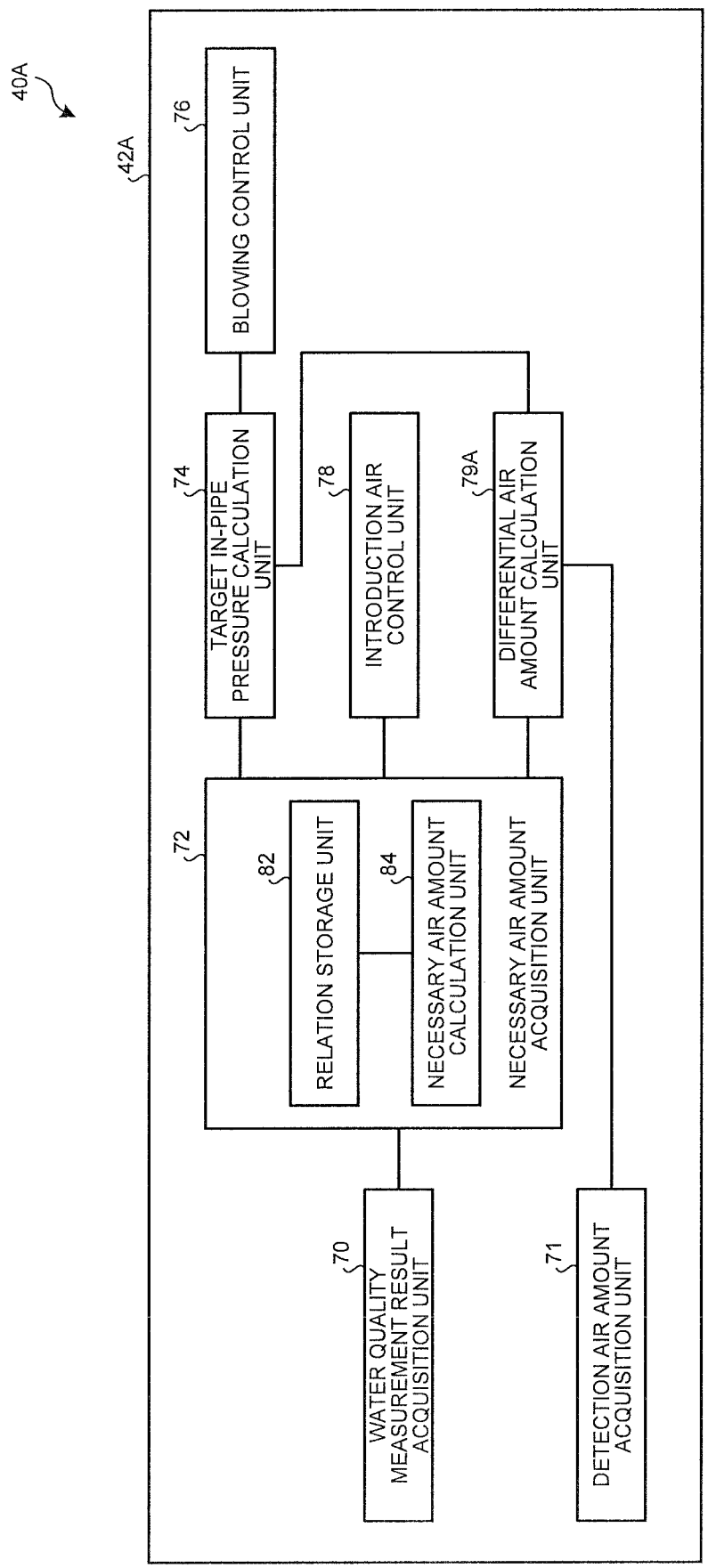
FIG. 8 is a block diagram illustrating the configuration of a control unit according to a second embodiment.

FIG. 8 is a block diagram illustrating the configuration of a control unit according to the second embodiment. As illustrated in FIG. 8, a controller 42A according to the second embodiment includes the differential air amount calculation unit 79A. The differential air amount calculation unit 79A acquires a total necessary air amount from the necessary air amount acquisition unit 72. The total necessary air amount is the sum of all necessary air amounts calculated for the respective reaction tanks 10. The differential air amount calculation unit 79A also acquires, from the detection air amount acquisition unit 71, the detection air amount of each branch pipe 34, in other words, the actual amount of air supplied to the branch pipe 34, which is measured by the branch pipe air amount measurement unit 48. Accordingly, the differential air amount calculation unit 79A acquires a total detection air amount as the sum of the detection air amounts of the branch pipes 34.

The target in-pipe pressure calculation unit 74 sets the target in-pipe pressure $P_Y$ based on each necessary air amount. Thus, the header pipe 32 is supplied with air at a pressure with which the necessary amount of air can be supplied to each of the reaction tanks 10. The introduction air control unit 78 adjusts the opening degree of each introduction valve 36 to distribute the air in the header pipe 32 to the branch pipes 34. Thus, normally, the necessary amount of air is supplied to each branch pipe 34, and thus the detection air amount of the branch pipe 34 is equal to the necessary air amount of the branch pipe 34. The total detection air amount is equal to the total necessary air amount.

However, the value (predetermined constant) of the pressure loss of each component used for calculating the target in-pipe pressure $P_Y$ potentially becomes different from the actual value due to, for example, degradation of any branch pipe 34 or clogging of an air discharge port at the diffuser 12. In such a case, the in-pipe pressure for actually supplying the necessary amount of air to each of the reaction tanks 10 is larger than the calculated target in-pipe pressure $P_Y$ in some cases. In other words, the total detection air amount as the sum of actually supplied air is smaller than the total necessary air amount. In this case, the necessary amount of air potentially cannot be appropriately supplied to the reaction tank 10. In addition, the in-pipe pressure for actually supplying the necessary amount of air to the reaction tank 10 is lower than the calculated target in-pipe pressure $P_Y$ in some cases. In such a case, the total detection air amount actually supplied is larger than the total necessary air amount. In this manner, the total necessary air amount and the total detection air amount are potentially different from each other when the in-pipe pressure for actually supplying the necessary amount of air to the reaction tank 10 is different from the calculated target in-pipe pressure $P_Y$.

The differential air amount calculation unit 79A calculates a differential air amount when the total necessary air amount and the total detection air amount are different from each other. The differential air amount is the difference value between the necessary air amount and the detection air amount. The differential air amount calculation unit 79A calculates the differential air amount for each of the reaction tanks 10. When the total necessary air amount and the total detection air amount are different from each other, the necessary air amount of at least one of the reaction tanks 10 and the detection air amount are different from each other. The target in-pipe pressure calculation unit 74 according to the second embodiment calculates a differential blowing pipe loss pressure based on the differential air amount. The differential blowing pipe loss pressure is the pressure of air lost due to the pressure loss in the blowing pipe 30 when the differential amount of air is supplied to the blowing pipe 30. The target in-pipe pressure calculation unit 74 calculates the differential blowing pipe loss pressure by a method same as the method of calculating the blowing pipe loss pressure $H_P$ described in the first embodiment. Specifically, the target in-pipe pressure calculation unit 74 calculates the differential blowing pipe loss pressure by using the differential air amount in place of the necessary air amount used to calculate the blowing pipe loss pressure $H_P$, and a total differential air amount in place of the total necessary air amount used to calculate the blowing pipe loss pressure $H_P$. The total differential air amount is the sum of differential air amounts, in other words, the difference value between the total necessary air amount and the total detection air amount. Then, the target in-pipe pressure calculation unit 74 calculates a differential in-pipe pressure based on the differential blowing pipe loss pressure. The target in-pipe pressure calculation unit 74 calculates the differential in-pipe pressure by a method same as the method of calculating the target in-pipe pressure $P_Y$ described in the first embodiment. Specifically, the target in-pipe pressure calculation unit 74 calculates the differential in-pipe pressure by using the differential blowing pipe loss pressure in place of the blowing pipe loss pressure $H_P$ used to calculate the target in-pipe pressure $P_Y$. The target in-pipe pressure calculation unit 74 calculates the differential in-pipe pressure for the path to each of the reaction tanks 10A, 10B, and 100, and determines a maximum value among these differential in-pipe pressures as an actual maximum value.

The target in-pipe pressure calculation unit 74 corrects the target in-pipe pressure $P_Y$ based on the differential in-pipe pressure. Specifically, when the total detection air amount is smaller than the total necessary air amount, the target in-pipe pressure calculation unit 74 calculates, as a corrected target in-pipe pressure, a value obtained by adding the differential in-pipe pressure to the target in-pipe pressure $P_Y$. When the total detection air amount is larger than the total necessary air amount, the target in-pipe pressure calculation unit 74 calculates, as the corrected target in-pipe pressure, a value obtained by subtracting the differential in-pipe pressure from the target in-pipe pressure $P_Y$. The blowing control unit 76 controls air supply from the blower unit 20 so that the pressure in the blowing pipe 30 becomes equal to the corrected target in-pipe pressure. Accordingly, the pressure in the blowing pipe 30 can be adjusted closer to the in-pipe pressure for actually supplying the necessary air amount to the reaction tank 10, and the total detection air amount can be adjusted to be equal to the total necessary air amount. The introduction air control unit 78 adjusts the amount of air to each branch pipe 34 by adjusting the opening degree of the introduction valve 36 again so that the detection air amount of the branch pipe 34 becomes equal to the necessary air amount. Accordingly, the necessary amount of air can be appropriately supplied to the reaction tank 10 when variation has occurred to the pressure loss due to, for example, degradation. For example, when the detection air amount is insufficient from the necessary air amount at one branch pipe 34, the opening degree of the introduction valve connected with the branch pipe 34 and the opening degree of the introduction valve 36 connected with another branch pipe 34 are adjusted to compensate the air insufficiency at the branch pipe 34 with air supplied to the other branch pipe 34. However, when the detection air amount is insufficient from the necessary air amount at the branch pipe 34, the insufficient pressure at the branch pipe 34 is caused by a pressure loss in some cases. In this case, the pressure cannot be increased by, for example, adjusting the introduction valve 36, and the branch pipe 34 potentially cannot be compensated with air. However, in the present embodiment, the in-pipe pressure is increased with the pressure loss taken into account, and thus the air compensation can be appropriately performed with the necessary amount of air even if the compensation cannot be achieved by adjusting the introduction valve 36.

The process of correcting the in-pipe pressure of the blowing pipe 30 in the second embodiment described above will be described below based on a flowchart. FIG. 9 is a flowchart for describing of the in-pipe pressure correction process according to the second embodiment. The processing illustrated in FIG. 9 is executed after the processing illustrated in FIG. 5 is executed to achieve the target in-pipe pressure $P_Y$ at the blowing pipe 30 (header pipe 32). The differential air amount calculation unit 79A acquires the value of the total detection air amount from the detection air amount acquisition unit 71, and acquires the value of the total necessary air amount from the necessary air amount acquisition unit 72. As illustrated in FIG. 9, the air supply amount controller 40A determines, through the differential air amount calculation unit 79A, whether the total detection air amount is different from the total necessary air amount (step S50). The differential air amount calculation unit 79A may determine that the total detection air amount is different from the total necessary air amount, in a case where the difference between the total detection air amount and the total necessary air amount is equal to or larger than a predetermined threshold. When the difference between the total detection air amount and the total necessary air amount is lower than the predetermined threshold, the differential air amount calculation unit 79A may determine that the total detection air amount is same as the total necessary air amount. When the total detection air amount is not different from the total necessary air amount (No at step S50), the air supply amount controller 40A proceeds to step S62.

When the total detection air amount is different from the total necessary air amount (Yes at step S50), the air supply amount controller 40A calculates the differential air amount through the differential air amount calculation unit 79A (step S52), calculates the differential blowing pipe loss pressure from the differential air amount through the target in-pipe pressure calculation unit 74 (step S54), and calculates the differential in-pipe pressure from the differential blowing pipe loss pressure (step S56). After having calculated the differential in-pipe pressure, the air supply amount controller 40A calculates the corrected target in-pipe pressure from the differential in-pipe pressure and the target in-pipe pressure through the target in-pipe pressure calculation unit 74 (step S58). Specifically, the target in-pipe pressure calculation unit 74 corrects the target in-pipe pressure with the differential in-pipe pressure, and sets the corrected value as the corrected target in-pipe pressure. After having calculated the corrected target in-pipe pressure, the air supply amount controller 40A controls, through the blowing control unit 76, air supply from the blower unit 20 so that the pressure in the blowing pipe 30 (header pipe 32) becomes equal to the corrected target in-pipe pressure (step S60). Thereafter, the air supply amount controller 40A proceeds to step S62, and ends the present processing when the processing is to be ended (Yes at step S62), or returns to step S50 to repeat the processing when the processing is not to be ended (No at step S62).

As described above, the air supply amount controller 40A according to the second embodiment includes the differential air amount calculation unit 79A. In a case where the total detection air amount is different from the total necessary air amount, the differential air amount calculation unit 79A calculates, for each of the reaction tanks 10, the differential air amount as the difference between the necessary air amount and the detection air amount. The target in-pipe pressure calculation unit 74 according to the second embodiment corrects the target in-pipe pressure $P_Y$ based on the pressure loss in the blowing pipe 30 (the differential blowing pipe loss pressure) in a case where the differential amount of air is supplied into the blowing pipe 30. The blowing control unit 76 according to the second embodiment controls air supply from the blower unit 20 so that the pressure in the blowing pipe 30 becomes equal to the target in-pipe pressure $P_Y$ corrected (corrected target in-pipe pressure).

When the total detection air amount is different from the total necessary air amount, the wastewater treatment system 1 according to the second embodiment corrects the target in-pipe pressure $P_Y$ based on the differential blowing pipe loss pressure, and corrects the pressure in the blowing pipe 30 to the corrected target in-pipe pressure $P_Y$ (corrected target in-pipe pressure). Thus, the wastewater treatment system 1 according to the second embodiment can appropriately supply the necessary amount of air to each of the reaction tanks 10 when variation has occurred to the pressure loss due to, for example, degradation.

The embodiments of the present invention are described above, but not limited by the described contents of these embodiments and the like. Any component described above includes a component that can be easily thought of by the skilled person in the art, a component identical in effect, and what is called an equivalent. Moreover, components described above can be combined with each other as appropriate. In addition, various kinds of omission, replacement, or change of the components can be performed without departing from the scope of the embodiments and the like described above.

REFERENCE SIGNS LIST 1 wastewater treatment system
10 reaction tank
12 diffuser
20 blower unit
22 blower
30 blowing pipe
31 introduction pipe
32 header pipe
34 branch pipe
40 air supply amount controller
42 controller
43 nitrate meter
44 ammonia meter
46 intake air measurement unit
47 header in-pipe pressure measurement unit
48 branch pipe air amount measurement unit
70 water quality measurement result acquisition unit
72 necessary air amount acquisition unit
74 target in-pipe pressure calculation unit
76 blowing control unit 78 introduction air control unit
82 relation storage unit
84 necessary air amount calculation unit
W wastewater

The invention claimed is:

1. A water treatment system comprising:
a plurality of reaction tanks configured to perform biotreatment on water to be treated;
a blowing pipe and an in-pipe pressure measurement unit, which is configured to measure a pressure in the blowing pipe, connected with the plurality of reaction tanks;
a blower unit configured to supply air for performing the biotreatment to the plurality of reaction tanks through the blowing pipe;
a target in-pipe pressure calculation unit, which is a computing apparatus, configured to calculate pressure losses in the blowing pipe based on a change in a necessary amount of air for performing the biotreatment on the water to be treated; and
a blowing control unit, which is a computing apparatus connected to the in-pipe pressure measurement unit and the blower unit, configured to control an amount of air supplied from the blower unit so that a pressure in the blowing pipe, which is measured by the in-pipe pressure measurement unit, becomes equal to a target in-pipe pressure in the blowing pipe, wherein
the blowing control unit is operable for determining a target in-pipe pressure for each of the plurality of reaction tanks based on the necessary amount of air for performing the biotreatment in each of the plurality of reaction tanks and a pressure loss in the blowing pipe in a case where the necessary amount of air is supplied into the blowing pipe,
the blowing control unit is operable for setting the target in-pipe pressure in the blowing pipe based on the necessary amount of air for each of the plurality of reaction tanks, and controls the amount of air supplied from the blower unit,
the blowing pipe includes a header pipe connected with the blower unit, a plurality of branch pipes branched from the header pipe and connected with the reaction tanks, respectively, with the in-pipe pressure measurement unit being operable for measuring pressure in the header pipe and the target in-pipe pressure calculation unit being operable for calculating a pressure loss at each of the plurality of branch pipes, and
the blowing control unit is operable for setting the target in-pipe pressure of the header pipe based on the pressure loss at each of the plurality of the branch pipes as calculated by the target in-pipe pressure calculation unit.

2. The water treatment system according to claim 1, further comprising a water quality measurement unit configured to measure a state of water to be treated in the reaction tanks, wherein
the blowing control unit is operable for determining, based on a measurement result by the water quality measurement unit, the necessary amount of air for the water to be treated in the reaction tanks.

3. The water treatment system according to claim 2, wherein the blowing control unit is operable to determine the necessary amount of air in each of the reaction tanks from a change of the measurement result of the water quality measurement unit, and change the target in-pipe pressure.

4. The water treatment system according to claim 3, wherein
the blowing control unit is operable to determine the necessary amount of air based on at least one of a nitrate concentration, an ammonia concentration, an amount of dissolved oxygen, an inflow amount of the water to be treated in the reaction tanks, and an oxidation reduction potential, as measured by respective water quality measurement units, and
the blowing control unit is operable to change the target in-pipe pressure according to a change of at least one of the nitrate concentration, the ammonia concentration, the amount of dissolved oxygen, the inflow amount of the water to be treated in the reaction tanks and the oxidation reduction potential.

5. The water treatment system according to claim 2, wherein
the blowing control unit is operable to determine the necessary amount of air based on at least one of a nitrate concentration, an ammonia concentration, an amount of dissolved oxygen, an inflow amount of the water to be treated in the reaction tanks, and an oxidation reduction potential, as measured by respective water quality measurement units, and
the blowing control unit is operable to change the target in-pipe pressure according to a change of at least one of the nitrate concentration, the ammonia concentration, the amount of dissolved oxygen, the inflow amount of the water to be treated in the reaction tanks and the oxidation reduction potential.

6. The water treatment system according to claim 1, wherein
the blowing control unit is operable to determine the necessary amount of air based on at least one of a nitrate concentration, an ammonia concentration, an amount of dissolved oxygen, and an inflow amount of the water to be treated in the reaction tanks, as measured by a respective water quality measurement unit, and
the blowing control unit is operable to change the target in-pipe pressure according to a change of at least one of the nitrate concentration, the ammonia concentration, the amount of dissolved oxygen, and the inflow amount of the water to be treated in the reaction tanks.

7. The water treatment system according to claim 1, wherein
the blowing control unit is operable to set the target in-pipe pressure of the blowing pipe based on a maximum target in-pipe pressure among the target in-pipe pressures for each of the reaction tanks as the target in-pipe pressure.

8. A control method of a water treatment system including: a plurality of reaction tanks configured to perform biotreatment on water to be treated; a blowing pipe and an in-pipe pressure measurement unit, which measures a pressure in the blowing pipe, connected with the plurality of reaction tanks; a blower unit configured to supply air for performing the biotreatment to the plurality of reaction tanks through the blowing pipe; a target in-pipe pressure calculation unit, which is a computing apparatus, configured to calculate pressure losses in the blowing pipe based on a change in a necessary amount of air for performing the biotreatment on the water to be treated; and a blowing control unit, which is a computing apparatus, connected to the in-pipe pressure measurement unit and the blower unit, the method comprising:
performing a blowing control step to control an amount of air supplied from the blower unit so that a pressure in the blowing pipe, which is measured by the in-pipe pressure measurement unit, becomes equal to a target in-pipe pressure, determining, in the blowing control step, the target in-pipe pressure for each of the plurality of reaction tanks, in the blowing control unit, based on a necessary amount of air for performing the biotreatment in each of the plurality of reaction tanks and a pressure loss in the blowing pipe in a case where the necessary amount of air is supplied into the blowing pipe, and setting the target in-pipe pressure of the blowing pipe, in the blowing control unit, based on the necessary amount of air for each of the plurality of reaction tanks, and controlling, in the blowing control unit, the amount of air supplied from the blower unit, wherein the blowing pipe includes a header pipe connected with the blower unit, a plurality of branch pipes branched from the header pipe and connected with the reaction tanks, respectively, with the in-pipe pressure measurement unit operable for measuring pressure in the header pipe and the target in-pipe pressure calculation unit operable for calculating a pressure loss at each of the plurality of branch pipes, and the target in-pipe pressure of the header pipe is set, in the blowing control unit, based on the pressure loss at each of the plurality of the branch pipes as calculated by the target in-pipe pressure calculation unit.

\* \* \* \* \*